US012510677B2

(12) United States Patent
Yun et al.

(10) Patent No.: US 12,510,677 B2
(45) Date of Patent: Dec. 30, 2025

(54) SEQUENTIAL ARRAY OF X-RAY IMAGING DETECTORS

(71) Applicant: Sigray, Inc., Concord, CA (US)

(72) Inventors: Wenbing Yun, Walnut Creek, CA (US); Janos Kirz, Berkeley, CA (US); Richard Ian Spink, Pleasant Hill, CA (US)

(73) Assignee: Sigray, Inc., Benicia, CA (US)

( * ) Notice: Subject to any disclaimer, the term of this patent is extended or adjusted under 35 U.S.C. 154(b) by 0 days.

(21) Appl. No.: 19/024,835

(22) Filed: Jan. 16, 2025

(65) Prior Publication Data

US 2025/0237769 A1 Jul. 24, 2025

Related U.S. Application Data

(60) Provisional application No. 63/622,240, filed on Jan. 18, 2024.

(51) Int. Cl.
G01T 1/16 (2006.01)
G01T 1/20 (2006.01)
G01T 1/29 (2006.01)

(52) U.S. Cl.
CPC .......... *G01T 1/1603* (2013.01); *G01T 1/2008* (2013.01); *G01T 1/20181* (2020.05); *G01T 1/20185* (2020.05); *G01T 1/2978* (2013.01)

(58) Field of Classification Search
CPC ....... G01T 1/16; G01T 1/1603; G01T 1/1606; G01T 1/20; G01T 1/2002; G01T 1/2006; G01T 1/2008; G01T 1/2018; G01T 1/20181; G01T 1/20182; G01T 1/20183; G01T 1/20185; G01T 1/20186; G01T 1/20187; G01T 1/20188; G01T 1/29; G01T 1/2907; G01T 1/2914; G01T 1/2921; G01T 1/2928; G01T 1/2978
USPC ................. 250/370.09, 370.11; 378/19, 98.8
See application file for complete search history.

(56) References Cited

U.S. PATENT DOCUMENTS

| | | | |
|---|---|---|---|
| 3,102,196 A | 8/1963 | Ladell | |
| 4,169,228 A | 9/1979 | Briska et al. | |
| 4,247,774 A * | 1/1981 | Brooks | A61B 6/582 378/19 |
| 4,642,811 A | 2/1987 | Georgopoulos | |
| 4,945,552 A | 7/1990 | Ueda | |
| 5,016,265 A | 5/1991 | Hoover et al. | |

(Continued)

FOREIGN PATENT DOCUMENTS

| | | |
|---|---|---|
| CN | 1656373 A | 8/2005 |
| CN | 1829910 A | 9/2006 |

(Continued)

OTHER PUBLICATIONS

"High performance benchtop EDXRF spectrometer with Windows®® software," published by: Rigaku Corp., Tokyo, Japan; 2017.

(Continued)

*Primary Examiner* — Allen C. Ho

(74) *Attorney, Agent, or Firm* — Knobbe, Martens, Olson & Bear, LLP

(57) ABSTRACT

An apparatus includes a plurality of x-ray imaging detectors having at least a first x-ray imaging detector and a second x-ray imaging detector. The first and second x-ray imaging detectors are configured sequentially along an x-ray beam propagation direction.

23 Claims, 7 Drawing Sheets

(56) References Cited

U.S. PATENT DOCUMENTS

| | | | |
|---|---|---|---|
| 5,132,997 | A | 7/1992 | Kojima |
| 5,173,928 | A | 12/1992 | Momose et al. |
| 5,204,887 | A | 4/1993 | Hayashida et al. |
| 5,220,591 | A | 6/1993 | Ohsugi et al. |
| 5,249,216 | A | 9/1993 | Ohsugi et al. |
| 5,280,176 | A | 1/1994 | Jach et al. |
| 5,684,857 | A | 11/1997 | De Bokx |
| 5,732,120 | A | 3/1998 | Shoji et al. |
| 5,778,039 | A | 7/1998 | Hossain |
| 5,790,628 | A | 8/1998 | Ishida |
| 5,812,629 | A | 9/1998 | Clauser |
| 5,832,052 | A | 11/1998 | Hirose et al. |
| 5,912,940 | A | 6/1999 | O'Hara |
| 5,930,586 | A | 7/1999 | Jain et al. |
| 6,108,398 | A | 8/2000 | Mazor et al. |
| 6,181,773 | B1 | 1/2001 | Lee et al. |
| 6,195,410 | B1 | 2/2001 | Cash, Jr. |
| 6,226,347 | B1 | 5/2001 | Golenhofen |
| 6,381,303 | B1 | 4/2002 | Vu et al. |
| 6,430,254 | B2 | 8/2002 | Wilkins |
| 6,442,231 | B1 | 8/2002 | O'Hara |
| 6,456,688 | B1 | 9/2002 | Taguchi et al. |
| 6,504,902 | B2 | 1/2003 | Iwasaki et al. |
| 6,512,814 | B2 | 1/2003 | Yokhin et al. |
| 6,577,704 | B1 | 6/2003 | Holz |
| 6,611,577 | B1 | 8/2003 | Yamagami |
| 6,639,968 | B2 | 10/2003 | Yokhin et al. |
| 6,711,234 | B1 | 3/2004 | Loxley et al. |
| 6,763,086 | B2 | 7/2004 | Platonov |
| 6,829,327 | B1 | 12/2004 | Chen |
| 6,882,701 | B2 | 4/2005 | Ferrandino et al. |
| 6,891,627 | B1 | 5/2005 | Levy et al. |
| 6,895,071 | B2 | 5/2005 | Yokhin et al. |
| 6,914,723 | B2 | 7/2005 | Yun et al. |
| 6,934,359 | B2 | 8/2005 | Chen |
| 6,965,663 | B2 * | 11/2005 | Ohzawa ............... G01N 23/223 |
| | | | 378/145 |
| 6,973,161 | B2 * | 12/2005 | Ohtsuki ................. G01N 23/04 |
| | | | 378/53 |
| 7,006,596 | B1 | 2/2006 | Janik |
| 7,010,086 | B2 | 3/2006 | Chopra |
| 7,010,092 | B2 * | 3/2006 | Winsor ................... A61B 6/482 |
| | | | 250/370.11 |
| 7,023,955 | B2 | 4/2006 | Chen et al. |
| 7,075,073 | B1 | 7/2006 | Janik et al. |
| 7,095,822 | B1 | 8/2006 | Yun |
| 7,119,953 | B2 | 10/2006 | Yun et al. |
| 7,120,228 | B2 | 10/2006 | Yokhin et al. |
| 7,180,979 | B2 | 2/2007 | Momose |
| 7,183,547 | B2 | 2/2007 | Yun et al. |
| 7,187,751 | B2 | 3/2007 | Kawahara et al. |
| 7,206,375 | B2 * | 4/2007 | Chen ..................... G01N 23/083 |
| | | | 378/53 |
| 7,215,736 | B1 | 5/2007 | Wang et al. |
| 7,218,703 | B2 | 5/2007 | Yada et al. |
| 7,221,731 | B2 | 5/2007 | Yada et al. |
| 7,245,696 | B2 | 7/2007 | Yun et al. |
| 7,258,485 | B2 | 8/2007 | Nakano et al. |
| 7,268,945 | B2 | 9/2007 | Yun et al. |
| 7,330,532 | B2 * | 2/2008 | Winsor ................... G01T 1/362 |
| | | | 250/370.11 |
| 7,388,942 | B2 | 6/2008 | Wang et al. |
| 7,394,890 | B1 | 7/2008 | Wang et al. |
| 7,400,704 | B1 | 7/2008 | Yun et al. |
| 7,406,151 | B1 | 7/2008 | Yun |
| 7,412,024 | B1 * | 8/2008 | Yun ........................ A61B 6/484 |
| | | | 378/53 |
| 7,414,787 | B2 | 8/2008 | Yun et al. |
| 7,453,560 | B2 | 11/2008 | Miyake |
| 7,463,712 | B2 | 12/2008 | Zhu et al. |
| 7,486,770 | B2 | 2/2009 | Baumann |
| 7,492,871 | B2 | 2/2009 | Popescu |
| 7,499,521 | B2 | 3/2009 | Wang et al. |
| 7,515,684 | B2 | 4/2009 | Gibson et al. |
| 7,519,153 | B1 | 4/2009 | Moore |
| 7,522,698 | B2 | 4/2009 | Popescu |
| 7,522,708 | B2 | 4/2009 | Heismann |
| 7,532,704 | B2 | 5/2009 | Hempel |
| 7,551,719 | B2 | 6/2009 | Yokhin et al. |
| 7,551,722 | B2 | 6/2009 | Ohshima et al. |
| 7,561,662 | B2 | 7/2009 | Wang et al. |
| 7,564,941 | B2 | 7/2009 | Baumann |
| 7,639,786 | B2 | 12/2009 | Baumann |
| 7,646,843 | B2 | 1/2010 | Popescu et al. |
| 7,653,174 | B2 | 1/2010 | Mazor et al. |
| 7,653,177 | B2 | 1/2010 | Baumann et al. |
| 7,680,243 | B2 | 3/2010 | Yokhin et al. |
| 7,778,389 | B2 | 8/2010 | Yoneyama |
| 7,787,588 | B1 | 8/2010 | Yun et al. |
| 7,796,725 | B1 | 9/2010 | Yun et al. |
| 7,796,726 | B1 | 9/2010 | Gendreau et al. |
| 7,809,113 | B2 | 10/2010 | Aoki et al. |
| 7,813,470 | B2 * | 10/2010 | Kuwabara ............ G01N 23/087 |
| | | | 378/57 |
| 7,813,475 | B1 | 10/2010 | Wu et al. |
| 7,817,777 | B2 | 10/2010 | Baumann et al. |
| 7,848,483 | B2 | 12/2010 | Platonov |
| 7,864,922 | B2 | 1/2011 | Kawabe |
| 7,889,838 | B2 | 2/2011 | David et al. |
| 7,899,154 | B2 | 3/2011 | Chen et al. |
| 7,920,676 | B2 | 4/2011 | Yun et al. |
| 7,924,973 | B2 | 4/2011 | Kottler et al. |
| 7,945,018 | B2 | 5/2011 | Heismann |
| 7,949,092 | B2 | 5/2011 | Brons |
| 7,949,095 | B2 | 5/2011 | Ning |
| 7,974,379 | B1 | 7/2011 | Case et al. |
| 7,983,381 | B2 | 7/2011 | David et al. |
| 8,005,185 | B2 | 8/2011 | Popescu |
| 8,009,796 | B2 | 8/2011 | Popescu |
| 8,009,797 | B2 | 8/2011 | Ouchi |
| 8,041,004 | B2 | 10/2011 | David |
| 8,058,621 | B2 | 11/2011 | Kommareddy |
| 8,068,579 | B1 | 11/2011 | Yun et al. |
| 8,073,099 | B2 | 12/2011 | Niu et al. |
| 8,139,711 | B2 | 3/2012 | Takahashi |
| 8,165,270 | B2 | 4/2012 | David et al. |
| 8,184,771 | B2 | 5/2012 | Murakoshi |
| 8,233,587 | B2 | 7/2012 | Sato |
| 8,243,879 | B2 | 8/2012 | Itoh et al. |
| 8,306,183 | B2 | 11/2012 | Koehler |
| 8,351,570 | B2 | 1/2013 | Nakamura |
| 8,353,628 | B1 | 1/2013 | Yun et al. |
| 8,374,309 | B2 | 2/2013 | Donath |
| 8,451,975 | B2 | 5/2013 | Tada |
| 8,513,603 | B1 | 8/2013 | Lederman et al. |
| 8,559,594 | B2 | 10/2013 | Ouchi |
| 8,559,597 | B2 | 10/2013 | Chen et al. |
| 8,565,371 | B2 | 10/2013 | Bredno |
| 8,591,108 | B2 | 11/2013 | Tada |
| 8,602,648 | B1 | 12/2013 | Jacobsen et al. |
| 8,632,247 | B2 | 1/2014 | Ishii |
| 8,755,487 | B2 | 6/2014 | Kaneko |
| 8,767,915 | B2 | 7/2014 | Stutman |
| 8,767,916 | B2 | 7/2014 | Hashimoto |
| 8,781,069 | B2 | 7/2014 | Murakoshi |
| 8,824,629 | B2 | 9/2014 | Ishii |
| 8,855,265 | B2 | 10/2014 | Engel |
| 8,859,977 | B2 | 10/2014 | Kondoh |
| 8,873,713 | B2 * | 10/2014 | Suyama ................. G01N 23/04 |
| | | | 378/98.12 |
| 8,908,824 | B2 | 12/2014 | Kondoh |
| 8,972,191 | B2 | 3/2015 | Stampanoni et al. |
| 8,989,474 | B2 | 3/2015 | Kido et al. |
| 9,001,967 | B2 | 4/2015 | Baturin |
| 9,016,943 | B2 | 4/2015 | Jacobsen et al. |
| 9,025,725 | B2 | 5/2015 | Kiyohara et al. |
| 9,031,201 | B2 | 5/2015 | Sato |
| 9,036,773 | B2 | 5/2015 | David et al. |
| 9,063,055 | B2 | 6/2015 | Ouchi |
| 9,086,536 | B2 | 7/2015 | Pang et al. |
| 9,129,715 | B2 | 9/2015 | Adler et al. |
| 9,222,899 | B2 | 12/2015 | Yamaguchi |
| 9,230,703 | B2 | 1/2016 | Mohr et al. |

(56) References Cited

U.S. PATENT DOCUMENTS

| | | |
|---|---|---|
| 9,234,856 B2 | 1/2016 | Mukaide |
| 9,239,392 B2* | 1/2016 | Gemma .............. G01T 1/2012 |
| 9,291,578 B2 | 3/2016 | Adler |
| 9,329,141 B2 | 5/2016 | Stutman |
| 9,357,975 B2 | 6/2016 | Baturin |
| 9,439,613 B2 | 9/2016 | Stutman |
| 9,448,190 B2 | 9/2016 | Yun et al. |
| 9,453,803 B2 | 9/2016 | Radicke |
| 9,480,447 B2 | 11/2016 | Mohr et al. |
| 9,486,175 B2 | 11/2016 | Fredenberg et al. |
| 9,494,534 B2 | 11/2016 | Baturin |
| 9,532,760 B2 | 1/2017 | Anton et al. |
| 9,541,511 B2 | 1/2017 | Vigliante |
| 9,551,677 B2 | 1/2017 | Mazor et al. |
| 9,557,280 B2 | 1/2017 | Pfeiffer et al. |
| 9,570,265 B1 | 2/2017 | Yun et al. |
| 9,588,066 B2 | 3/2017 | Pois et al. |
| 9,594,036 B2 | 3/2017 | Yun et al. |
| 9,632,040 B2 | 4/2017 | Stutman |
| 9,700,267 B2 | 7/2017 | Baturin et al. |
| 9,719,947 B2 | 8/2017 | Yun et al. |
| 9,748,012 B2 | 8/2017 | Yokoyama |
| 9,757,081 B2 | 9/2017 | Proksa |
| 9,761,021 B2 | 9/2017 | Koehler |
| 9,770,215 B2 | 9/2017 | Souchay et al. |
| 9,778,213 B2 | 10/2017 | Bakeman et al. |
| 9,823,203 B2 | 11/2017 | Yun et al. |
| 9,826,949 B2 | 11/2017 | Ning |
| 9,841,388 B2 | 12/2017 | Creux et al. |
| 9,861,330 B2 | 1/2018 | Rossl |
| 9,874,531 B2 | 1/2018 | Yun et al. |
| 9,881,710 B2 | 1/2018 | Roessl |
| 9,916,655 B2 | 3/2018 | Sampanoni |
| 10,028,716 B2 | 7/2018 | Rossl |
| 10,045,753 B2 | 8/2018 | Teshima |
| 10,074,451 B2 | 9/2018 | Kottler et al. |
| 10,076,297 B2 | 9/2018 | Bauer |
| 10,085,701 B2 | 10/2018 | Hoshino |
| 10,141,081 B2 | 11/2018 | Preusche |
| 10,151,713 B2 | 12/2018 | Wu et al. |
| 10,153,061 B2 | 12/2018 | Yokoyama |
| 10,153,062 B2 | 12/2018 | Gall et al. |
| 10,247,683 B2 | 4/2019 | Yun et al. |
| 10,267,752 B2 | 4/2019 | Zhang et al. |
| 10,267,753 B2 | 4/2019 | Zhang et al. |
| 10,295,485 B2 | 5/2019 | Yun et al. |
| 10,304,580 B2 | 5/2019 | Yun et al. |
| 10,349,908 B2 | 7/2019 | Yun et al. |
| 10,352,695 B2 | 7/2019 | Dziura et al. |
| 10,352,880 B2 | 7/2019 | Yun et al. |
| 10,401,309 B2 | 9/2019 | Yun et al. |
| 10,416,099 B2 | 9/2019 | Yun et al. |
| 10,466,185 B2 | 11/2019 | Yun et al. |
| 10,473,598 B2 | 11/2019 | Ogata et al. |
| 10,485,492 B2 | 11/2019 | Koehler et al. |
| 10,514,345 B2 | 12/2019 | Ogata et al. |
| 10,514,346 B2 | 12/2019 | Sako |
| 10,568,588 B2 | 2/2020 | Koehler et al. |
| 10,578,566 B2 | 3/2020 | Yun et al. |
| 10,634,628 B2 | 4/2020 | Kasper et al. |
| 10,653,376 B2 | 5/2020 | Yun et al. |
| 10,697,902 B2 | 6/2020 | Sharma et al. |
| 10,754,047 B2* | 8/2020 | Shimizukawa ....... G01T 1/2006 |
| 10,782,252 B2 | 9/2020 | Gateshki et al. |
| 10,794,845 B2 | 10/2020 | Filsinger |
| 10,881,366 B2* | 1/2021 | Taninai ................. A61B 6/505 |
| 10,895,541 B2 | 1/2021 | Shchegrov et al. |
| 10,962,491 B2 | 3/2021 | Yun et al. |
| 10,976,270 B2 | 4/2021 | Wormington |
| 10,989,819 B2 | 4/2021 | Wieczorek et al. |
| 11,054,375 B2 | 7/2021 | Seidler et al. |
| 11,175,243 B1 | 11/2021 | Yun et al. |
| 11,215,572 B2 | 1/2022 | Yun et al. |
| 11,378,530 B2* | 7/2022 | Sato ................... G01N 23/2209 |
| 11,549,895 B2 | 1/2023 | Yun et al. |
| 11,668,662 B2* | 6/2023 | Yamamoto ......... G01N 23/2209 250/307 |
| 11,686,692 B2 | 6/2023 | Vine et al. |
| 11,733,185 B2 | 8/2023 | Ogata et al. |
| 11,796,490 B2 | 10/2023 | Seidler et al. |
| 11,885,755 B2 | 1/2024 | Yun et al. |
| 12,209,977 B2 | 1/2025 | Yun et al. |
| 2001/0046276 A1 | 11/2001 | Schneider et al. |
| 2002/0090051 A1 | 7/2002 | Oikawa |
| 2002/0150208 A1 | 10/2002 | Yohkin et al. |
| 2003/0072413 A1 | 4/2003 | Yokhin et al. |
| 2003/0142781 A1 | 7/2003 | Kawahara |
| 2003/0215060 A1 | 11/2003 | Ohzawa |
| 2003/0223536 A1 | 12/2003 | Yun et al. |
| 2004/0028186 A1 | 2/2004 | Yokhin et al. |
| 2004/0047446 A1 | 3/2004 | Platonov |
| 2005/0087699 A1 | 4/2005 | Miyake |
| 2005/0265517 A1 | 12/2005 | Gary |
| 2005/0282300 A1 | 12/2005 | Yun et al. |
| 2005/0286680 A1 | 12/2005 | Momose |
| 2006/0062350 A1 | 3/2006 | Yokhin |
| 2006/0088139 A1 | 4/2006 | Nankano et al. |
| 2006/0120508 A1 | 6/2006 | Chen |
| 2006/0169893 A1 | 8/2006 | Lee et al. |
| 2006/0182322 A1 | 8/2006 | Bernhardt et al. |
| 2007/0069154 A1 | 3/2007 | Sullivan |
| 2007/0108387 A1 | 5/2007 | Yun et al. |
| 2007/0183563 A1 | 8/2007 | Baumann |
| 2007/0183579 A1 | 8/2007 | Baumann et al. |
| 2007/0189449 A1 | 8/2007 | Baumann |
| 2007/0248215 A1 | 10/2007 | Ohshima et al. |
| 2007/0285643 A1 | 12/2007 | Wedowski et al. |
| 2008/0043908 A1 | 2/2008 | Teramoto et al. |
| 2008/0084966 A1 | 4/2008 | Aoki et al. |
| 2008/0159475 A1 | 7/2008 | Mazor et al. |
| 2008/0170662 A1 | 7/2008 | Reinhold |
| 2008/0181363 A1 | 7/2008 | Fenter et al. |
| 2008/0273662 A1 | 11/2008 | Yun |
| 2009/0003516 A1 | 1/2009 | Chen et al. |
| 2009/0052619 A1 | 2/2009 | Endoh |
| 2009/0092227 A1 | 4/2009 | David |
| 2009/0154640 A1 | 6/2009 | Baumann et al. |
| 2009/0316857 A1 | 12/2009 | David et al. |
| 2010/0061508 A1 | 3/2010 | Takahashi |
| 2010/0091947 A1 | 4/2010 | Niu |
| 2010/0172470 A1 | 7/2010 | Kuwabara |
| 2010/0246765 A1 | 9/2010 | Murakoshi |
| 2010/0284513 A1 | 11/2010 | Kawabe |
| 2010/0310041 A1 | 12/2010 | Adams et al. |
| 2010/0329532 A1 | 12/2010 | Masuda et al. |
| 2011/0206179 A1 | 8/2011 | Bendahan |
| 2011/0222650 A1 | 9/2011 | Muenker |
| 2011/0243302 A1 | 10/2011 | Murakoshi |
| 2011/0261164 A1 | 10/2011 | Olesen et al. |
| 2011/0268252 A1 | 11/2011 | Ozawa et al. |
| 2012/0041679 A1 | 2/2012 | Stampanoni |
| 2012/0224670 A1 | 9/2012 | Kiyohara et al. |
| 2012/0228475 A1 | 9/2012 | Pang et al. |
| 2013/0011040 A1 | 1/2013 | Kido et al. |
| 2013/0039460 A1 | 2/2013 | Levy |
| 2013/0108012 A1 | 5/2013 | Sato |
| 2013/0108022 A1 | 5/2013 | Kugland et al. |
| 2013/0202084 A1 | 8/2013 | Piorek et al. |
| 2013/0251100 A1 | 9/2013 | Sasaki et al. |
| 2013/0308112 A1 | 11/2013 | Clube et al. |
| 2014/0023973 A1 | 1/2014 | Marconi et al. |
| 2014/0037052 A1 | 2/2014 | Adler |
| 2014/0064445 A1 | 3/2014 | Adler |
| 2014/0072104 A1 | 3/2014 | Jacobsen et al. |
| 2014/0105353 A1 | 4/2014 | Pfeiffer et al. |
| 2014/0105363 A1 | 4/2014 | Chen et al. |
| 2014/0112440 A1 | 4/2014 | David et al. |
| 2014/0146945 A1 | 5/2014 | Fredenberg et al. |
| 2014/0153692 A1 | 6/2014 | Larkin et al. |
| 2014/0205057 A1 | 7/2014 | Koehler et al. |
| 2014/0226785 A1 | 8/2014 | Stutman et al. |
| 2014/0270060 A1 | 9/2014 | Date et al. |
| 2015/0023472 A1 | 1/2015 | Schmitt et al. |
| 2015/0030126 A1 | 1/2015 | Radicke |

(56) References Cited

U.S. PATENT DOCUMENTS

| | | |
|---|---|---|
| 2015/0043713 A1 | 2/2015 | Chen |
| 2015/0049860 A1 | 2/2015 | Das |
| 2015/0051877 A1 | 2/2015 | Bakeman et al. |
| 2015/0055743 A1 | 2/2015 | Vedantham et al. |
| 2015/0055745 A1 | 2/2015 | Holzner et al. |
| 2015/0071402 A1 | 3/2015 | Handa |
| 2015/0117599 A1 | 4/2015 | Yun et al. |
| 2015/0146847 A1 | 5/2015 | Liu |
| 2015/0160354 A1 | 6/2015 | Mertens et al. |
| 2015/0243397 A1 | 8/2015 | Yun et al. |
| 2015/0247811 A1 | 9/2015 | Yun et al. |
| 2015/0260663 A1 | 9/2015 | Yun et al. |
| 2015/0270023 A1 | 9/2015 | Adler |
| 2015/0323474 A1 | 11/2015 | Case et al. |
| 2015/0323478 A1 | 11/2015 | Stutman |
| 2015/0357069 A1 | 12/2015 | Yun et al. |
| 2016/0047759 A1 | 2/2016 | Wang et al. |
| 2016/0066870 A1 | 3/2016 | Yun et al. |
| 2016/0091701 A1 | 3/2016 | Raghunathan |
| 2016/0109389 A1 | 4/2016 | Suzuki et al. |
| 2016/0178541 A1 | 6/2016 | Hwang et al. |
| 2016/0206259 A1 | 7/2016 | Auclair et al. |
| 2016/0341674 A1 | 11/2016 | Wu et al. |
| 2016/0351283 A1 | 12/2016 | Adler et al. |
| 2017/0038481 A1 | 2/2017 | Cheng et al. |
| 2017/0047191 A1 | 2/2017 | Yun et al. |
| 2017/0162288 A1 | 6/2017 | Yun et al. |
| 2017/0176356 A1 | 6/2017 | Hoffman et al. |
| 2017/0184520 A1 | 6/2017 | Mortensen et al. |
| 2017/0227476 A1 | 8/2017 | Zhang et al. |
| 2017/0234811 A1 | 8/2017 | Zhang et al. |
| 2017/0261442 A1 | 9/2017 | Yun et al. |
| 2017/0336334 A1 | 11/2017 | Yun et al. |
| 2018/0182131 A1 | 6/2018 | Koehler et al. |
| 2018/0202951 A1 | 7/2018 | Yun et al. |
| 2018/0261352 A1 | 9/2018 | Matsuyama et al. |
| 2018/0306734 A1 | 10/2018 | Morimoto et al. |
| 2018/0323032 A1 | 11/2018 | Strelec et al. |
| 2018/0348151 A1 | 12/2018 | Kasper et al. |
| 2019/0011379 A1 | 1/2019 | Yun et al. |
| 2019/0017946 A1 | 1/2019 | Wack et al. |
| 2019/0027265 A1 | 1/2019 | Dey et al. |
| 2019/0064084 A1 | 2/2019 | Ullom et al. |
| 2019/0086342 A1 | 3/2019 | Pois et al. |
| 2019/0115184 A1 | 4/2019 | Zalubovsky |
| 2019/0145917 A1 | 5/2019 | Yun et al. |
| 2019/0172681 A1 | 6/2019 | Owen et al. |
| 2019/0204757 A1 | 7/2019 | Brussard et al. |
| 2019/0206652 A1 | 7/2019 | Akinwande et al. |
| 2019/0212281 A1 | 7/2019 | Shchgegrov |
| 2019/0216416 A1 | 7/2019 | Koehler et al. |
| 2019/0219713 A1 | 7/2019 | Booker et al. |
| 2019/0257774 A1 | 8/2019 | Seidler et al. |
| 2019/0261935 A1 | 8/2019 | Kitamura |
| 2019/0302042 A1 | 10/2019 | Yun et al. |
| 2019/0317027 A1 | 10/2019 | Tsuboi et al. |
| 2019/0323976 A1 | 10/2019 | Vinshtein |
| 2019/0331616 A1 | 10/2019 | Schaff et al. |
| 2019/0369271 A1 | 12/2019 | Yun et al. |
| 2019/0369272 A1 | 12/2019 | Yun et al. |
| 2019/0391087 A1 | 12/2019 | Matejka et al. |
| 2020/0003712 A1 | 1/2020 | Kataoka et al. |
| 2020/0041429 A1 | 2/2020 | Cho et al. |
| 2020/0072770 A1 | 3/2020 | Yun et al. |
| 2020/0088656 A1 | 3/2020 | Pois et al. |
| 2020/0090826 A1 | 3/2020 | Adler |
| 2020/0098537 A1 | 3/2020 | Yun et al. |
| 2020/0103358 A1 | 4/2020 | Wiell et al. |
| 2020/0155088 A1 | 5/2020 | Gruener et al. |
| 2020/0158662 A1 | 5/2020 | Horiba et al. |
| 2020/0182806 A1 | 6/2020 | Kappler et al. |
| 2020/0225172 A1 | 7/2020 | Sato et al. |
| 2020/0225173 A1 | 7/2020 | Sato et al. |
| 2020/0225371 A1 | 7/2020 | Greenberg et al. |
| 2020/0232937 A1 | 7/2020 | Yaroshenko et al. |
| 2020/0279351 A1 | 9/2020 | Ratner et al. |
| 2020/0292475 A1 | 9/2020 | Cao et al. |
| 2020/0300789 A1 | 9/2020 | Osakabe et al. |
| 2020/0300790 A1 | 9/2020 | Gellineau et al. |
| 2020/0303265 A1 | 9/2020 | Gellineau et al. |
| 2020/0319120 A1 | 10/2020 | Kitamura et al. |
| 2020/0337659 A1 | 10/2020 | Sano et al. |
| 2020/0378905 A1 | 12/2020 | Safai |
| 2020/0378908 A1 | 12/2020 | Fujimura et al. |
| 2020/0386696 A1 | 12/2020 | Sato et al. |
| 2021/0055237 A1 | 2/2021 | Shchegrov et al. |
| 2021/0080408 A1 | 3/2021 | Yun et al. |
| 2021/0116399 A1 | 4/2021 | Ogata et al. |
| 2021/0236069 A1 | 8/2021 | Kotian |
| 2021/0255123 A1 | 8/2021 | Koskinen et al. |
| 2021/0356412 A1 | 11/2021 | Yun et al. |
| 2022/0003694 A1 | 1/2022 | Seidler et al. |
| 2022/0026377 A1 | 1/2022 | Yamamoto |
| 2022/0082515 A1 | 3/2022 | Yun et al. |
| 2022/0178851 A1 | 6/2022 | Yun et al. |
| 2022/0404297 A1 | 12/2022 | Nii |
| 2023/0280291 A1 | 9/2023 | Yun et al. |
| 2023/0349842 A1 | 11/2023 | Yun et al. |
| 2024/0280515 A1 | 8/2024 | Yun et al. |
| 2025/0146960 A1 | 5/2025 | Yun et al. |

FOREIGN PATENT DOCUMENTS

| | | |
|---|---|---|
| CN | 101257851 B | 9/2008 |
| CN | 101532969 B | 9/2009 |
| CN | 101566591 A | 10/2009 |
| CN | 101576515 A | 11/2009 |
| CN | 101413905 A | 3/2011 |
| CN | 102325498 B | 1/2012 |
| CN | 102507623 A | 6/2012 |
| CN | 102551761 A | 7/2012 |
| CN | 103604818 A | 2/2014 |
| CN | 104264228 A | 1/2015 |
| CN | 104068875 A | 5/2017 |
| CN | 206531787 U | 9/2017 |
| CN | 113218974 | 8/2021 |
| CN | 109030529 | 12/2021 |
| CN | 114757105 | 7/2022 |
| DE | 102007048743 A1 | 6/2010 |
| DE | 102013013344 A1 | 2/2015 |
| DE | 102013219652 A1 | 4/2015 |
| EP | 0751533 | 1/1997 |
| EP | 1169713 | 1/2006 |
| EP | 2592626 | 5/2013 |
| EP | 3168856 A2 | 5/2017 |
| JP | H01-097844 A | 4/1989 |
| JP | H04-285847 A | 10/1992 |
| JP | H05-164987 | 6/1993 |
| JP | H06-188092 | 7/1994 |
| JP | H06-213833 A | 8/1994 |
| JP | H07-021469 B | 3/1995 |
| JP | H07-194592 | 8/1995 |
| JP | H07-311165 A | 11/1995 |
| JP | H08-061941 A | 3/1996 |
| JP | H08-128971 | 5/1996 |
| JP | H08-184572 | 7/1996 |
| JP | H09-166488 | 6/1997 |
| JP | H10-318737 A | 12/1998 |
| JP | H11-006804 A | 1/1999 |
| JP | H11-160500 A | 6/1999 |
| JP | H11-304728 | 11/1999 |
| JP | H11-352079 | 12/1999 |
| JP | 2001-021507 | 1/2001 |
| JP | 2001-124711 | 5/2001 |
| JP | 2001-235437 | 8/2001 |
| JP | 2002-214165 | 7/2002 |
| JP | 2003-130819 | 5/2003 |
| JP | 2003-149392 | 5/2003 |
| JP | 2003-294658 | 10/2003 |
| JP | 2003-329616 | 11/2003 |
| JP | 2004-333131 | 11/2004 |
| JP | 2005-233760 | 9/2005 |
| JP | 2006-501444 | 1/2006 |
| JP | 2007-212272 A | 8/2007 |

(56) References Cited

FOREIGN PATENT DOCUMENTS

| | | |
|---|---|---|
| JP | 2007-218683 | 8/2007 |
| JP | 2008-200359 | 4/2008 |
| JP | 2008-145111 | 6/2008 |
| JP | 2008-197495 | 8/2008 |
| JP | 2009-002805 | 1/2009 |
| JP | 2009-195349 | 3/2009 |
| JP | 2009-139337 | 6/2009 |
| JP | 2010-032341 A | 2/2010 |
| JP | 2010-127924 | 6/2010 |
| JP | 2010-236986 | 10/2010 |
| JP | 2011-033537 | 2/2011 |
| JP | 2011-095224 | 5/2011 |
| JP | 2011-242313 | 5/2011 |
| JP | 2011-107005 | 6/2011 |
| JP | 2011-218147 | 11/2011 |
| JP | 2012-032387 | 2/2012 |
| JP | 2007-309687 | 6/2012 |
| JP | 2012-112790 | 6/2012 |
| JP | 2012-112914 | 6/2012 |
| JP | 2012-187341 | 10/2012 |
| JP | H06-102399 A | 10/2012 |
| JP | 2008-039772 | 12/2012 |
| JP | 2012-254294 | 12/2012 |
| JP | 2013-042983 | 3/2013 |
| JP | 2013-096750 | 5/2013 |
| JP | 2013-113782 | 6/2013 |
| JP | 2013-181811 | 9/2013 |
| JP | 2014-222191 | 11/2014 |
| JP | 2015-047306 | 3/2015 |
| JP | 2015-072263 | 4/2015 |
| JP | 2015-077289 | 4/2015 |
| JP | 2017-040618 | 2/2017 |
| JP | 2019-078593 | 5/2019 |
| KR | 10-2004-0072780 | 8/2004 |
| KR | 10-2005-0038788 A | 4/2005 |
| KR | 10-2006-0088272 A | 8/2006 |
| KR | 10-2012-0012391 | 2/2012 |
| KR | 10-2012-0091591 A | 8/2012 |
| KR | 10-2014-0059688 | 5/2014 |
| WO | WO 1998/041992 | 9/1998 |
| WO | WO 2006/010091 | 1/2006 |
| WO | WO 2007/125833 | 11/2007 |
| WO | WO 2008/068044 | 6/2008 |
| WO | WO 2009/104560 | 8/2009 |
| WO | WO 2009/121932 | 10/2009 |
| WO | WO 2011/032572 | 3/2011 |
| WO | WO 2012/032950 | 3/2012 |
| WO | WO 2013/004574 | 1/2013 |
| WO | WO 2013/111050 | 8/2013 |
| WO | WO 2013/160153 | 10/2013 |
| WO | WO 2015/066333 | 5/2015 |
| WO | WO 2015/168473 | 11/2015 |
| WO | WO 2015/176023 | 11/2015 |
| WO | WO 2015/187219 | 12/2015 |
| WO | WO 2016/187623 | 11/2016 |
| WO | WO 2017/031740 | 3/2017 |
| WO | WO 2017/213996 | 12/2017 |
| WO | WO 2018/122213 | 7/2018 |
| WO | WO 2018/175570 | 9/2018 |

OTHER PUBLICATIONS

Abramson et al., "hklhop: a Selection Tool for Asymmetric Reflections of Spherically Bent Crystal Analysers for High Resolution X-ray Spectroscopy," arXiv:2409.10698 (2024).
Altapova et al., "Phase contrast laminography based on Talbot interferometry," Opt. Express, vol. 20, No. 6, (2012) pp. 6496-6508.
Andreyev et al., "Boosting the versatility of X-ray microscopes by using robotic arm sample holders," 13th Conf. on Ind. Comp. Tomography, doi.org/10.58286/29261 (2024).
Anklamm et al., "A novel von Hamos spectrometer for efficient X-ray emission spectroscopy in the laboratory," Rev. Sci. Instr. vol. 85 p. 053110 (2014).
Arsana et al., "Laboratory Liquid-Jet X-ray Microscopy and X-ray Fluorescence Imaging for Biomedical Applications," Int'l J. Mol. Sci., vol. 25, p. 920 (2024).
Bachucki et al., "Laboratory-based double X-ray spectrometer for simultaneous X-ray emission and X-ray absorption studies," J. Anal. Atomic Spectr. DOI:10.1039/C9JA00159J (2019).
Baron et al., "A compact optical design for Bragg reflections near backscattering," J. Synchrotron Rad., vol. 8 (2001), pp. 1127-1130.
Bauer et al., "Increasing the sensitivity of micro X-ray fluorescence spectroscopy through an optimized adaptation of polycapillary lenses to a liquid metal jet source," J. Anal. At. Spectrom. DOI:10.1039/d1ja00295c (2021).
Bech, "X-ray imaging with a grating interferometer," University of Copenhagen PhD. Thesis, (May 1, 2009).
Bech, "In-vivo dark-field and phase-contrast x-ray imaging," Scientific Reports 3, (2013), Article No. 03209.
Bertaux et al., "Sub-pixel high-resolution imaging of high-energy x-rays inspired by sub-wavelength optical imaging, " Op. Express, vol. 29, No. 22-25, p. 35003 (2021).
Bertilson et al., "Analyzer-free Hard X-ray Interferometry," Phys. Med. Biol. https://doi.org/10.1088/1361-6560/ad1f84 (2024).
Birkholz, "Chapter 4: Grazing Incidence Configurations," Thin Film Analysis by X-ray Scattering (Wiley-VCH Verlag Gmbh & Co. KGaA, Weinheim, Germany, 2006).
Birnbacher et al., "Quantitative X-ray phase contrast computed tomography with grating interferometry," European J. of Nucl. Med. and Mol. Imaging, https://doi.org/10.1007/s00259-021-05259-6 (2021).
Bogdanowicz et al., "Model-free measurement of lateral recess in gate-all-around transistors with micro hard-X-ray fluorescence," J. Micro/Nanopattern, Mater. Metrol., vol. 22(3), pp. 034001-1-8 (2023).
Brombal et al., "PEPI Lab: a flexible compact multi-modal setup for X-ray phase-contrast and spectral imaging," Sci. Rep. 13, p. 4206, https://doi.org/10.1038/s41598-023-30316-5 (2023).
Buchanan et al., "Effective modelling of high-energy laboratory-based x-ray phase contrast imaging utilising absorption masks or gratings," J. Appl. Physics (accepted) (2020).
Celio et al., "Laboratory X-Ray-Assisted Device Alteration for Fault Isolation and Post-Silicon Debug," 2024 IEEE Int'l Reliability Physics Symp. (IRPS), doi: 10.1109/IRPS48228.2024.10529312 (2024).
Chen et al., "Advance in detection of low sulfur content by wavelength dispersive XRF," Proceedings of the Annual ISA Analysis Division Symposium (2002).
Chen et al., "A Ray Tracing Survey of Asymmetric Operation of the X-ray Rowland Circle Using Spherically Bent Crystal Analyzers," arXiv:2409.13119v1 (2024).
Chinamatira et al., "X-ray phase contrast imaging: An alternative approach to laboratory-based sources," AFLS2024, contribution ID: 198 (2024).
Coan et al., "In vivo x-ray phase contrast analyzer-based imaging for longitudinal osteoarthritis studies in guinea pigs," Phys. Med. Biol. vol. 55(24) (2010), pp. 7649-7662.
Cohen et al., "Tunable laboratory extended x-ray absorption fine structure system," Rev. Sci. Instr. vol. 51, No. 3, Mar. 1980, pp. 273-277.
Costin et al., "Combining a Computed Laminography Approach with Tomographic Analysis for a Study of Weld Joints," 9th Conf. on Ind. Comp. Tomography, Padova, Italy (iCT 2019), pp. 1-8 (2019).
David et al., "Hard X-ray phase imaging and tomography using a grating interferometer," Spectrochimica Acta Part B vol. 62 (2007) pp. 626-630.
Davis et al., "Bridging the Micro-to-Macro Gap: A New Application for Micro X-Ray Fluorescence," Microsc. Microanal., vol. 17(3) (Jun. 2011), pp. 410-417.
De Pauw et al., "A review of laboratory, commercially available, and facility based wavelength dispersive X-ray fluorescence spectrometers," J. Anal. At. Spectrom., doi: 10.1039/d3ja00315a (2023).
Detlefs et al., "Fast Chemical Contrast by X-ray Fluorescence Intensity Ratio Detection," Anal. Chem., https://doi.org/10.1021/acs.analchem.3c00623 (2023).

(56) References Cited

OTHER PUBLICATIONS

Dewulf et al., "Advances in the metrological traceability and performance of X-ray computed tomography," CIRP Annals—Manuf. Tech. vol. 00, 1-24 (2022).

Diaz et al., "Monte Carlo Simulation of Scatter Field for Calculation of Contrast of Discs in Synthetic CDMAM Images," In: Digital Mammography, Proceedings 10th International Workshop IWDM 2010 (Springer Verlag, Berlin Heidelberg), (2010), pp. 628-635 (9 pages).

Dibernardo, "Non-disruptive techniques for depth profiling in photoemission spectroscopy," Nature Review Physics, https://doi.org/10.1038/s42254-021-00331-4 (2021).

Dittler et al., "A mail-in and user facility for X-ray absorption near-edge structure: the CEI-XANES laboratory X-ray spectrometer at University of Washington," J. Synch. Rad. Vol. 26, eight pages, (2019).

Dong et al., "Improving Molecular Sensitivity in X-Ray Fluorescence Molecular Imaging (XFMI) of Iodine Distribution in Mouse-Sized Phantoms via Excitation Spectrum Optimization," IEEE Access, vol. 6, pp. 56966-56976 (2018).

Dreier et al., "Improved resolution in advanced packaging metrology through advanced nano-focus X-ray sources," 2024 25th Int'l Conf. Elect. Packaging Tech. (ICEPT), doi: 10.1109/ICEPT63120.2024.10668783 (2024).

Dreier et al., "X-ray nano-tomography enabling sub-micron resolution failure analysis for advanced packaging," ISTFA 2024: Proc. From 50th Int'l Symp. for Testing and Failure Analysis Conf., https://doi.org/10.31399/asm.cp.istfa2024p0169 (2024).

Du et al., "Removal of artifacts caused by grating imperfections in X-ray phase contrast tomography," J. of Inst. vol. 16, P06039, doi.org/10.1088/1748-0221/16/06/P06039 (2021).

Erko et al., "X-ray Optics," Ch. 3 of "Handbook of Practical X-Ray Fluorescence Analysis," B. Beckhoff et al., eds. (Springer, Berlin, Germany, 2006), pp. 85-198.

Espes et al., "High-resolution X-ray source with advanced e-beam technology: pushing the resolution limitation for lab-scale NanoCT," Micros. Microanal., vol. 27 (Suppl. 1), p. 1230 (2021).

Fahmi et al., "Biological applications of X-ray fluorescence microscopy: exploring the subcellular topography and speciation of transition metals," Current Opinion in Chem. Bio. vol. 11, pp. 121-127 (2007).

Feng et al., "Reduction of Compton Background Noise for X-ray Fluorescence Computed Tomography with Deep Learning," Photonics, vol. 9, p. 108 (2022).

Fernández-Ruiz, "TXRF Spectrometry as a Powerful Tool for the Study of Metallic Traces in Biological Systems," Development in Analytical Chemistry, vol. 1 (2014), pp. 1-14.

Fisher et al., "Laminography in the lab: imaging planar objects using a conventional x-ray CT scanner," Meas. Sci. Technol., vol. 30, p. 035401 (2019).

Flenner et al., "Hard X-ray full-field nanoimaging using a direct photon-counting detector," J. Synch. Rad., https://doi.org/10.1107/S1600577522012103 (2022).

Flenner et al., "Dual-beam X-ray nano-holotomography," J. Synch. Rad., https://doi.org/10.1107/51600577524003801 (2024).

Fraunhofer, "High-resolution computed laminography (HRCL) for electronic components," https://www.ikts.fraunhofer.de/en/departments/electronics_microsystems_biomedicine/condition_monitoring_non-destructive_testing/ndt_test_lab/3D-X-ray_inspection_industrial_components/computed_laminography _printed_circuit_board_inspection.html, (2024).

Gaur et al., "On the method of calibration of the energy dispersive EXAFS beamline and Indus-2 and fitting theoretical model to the EXAFS spectrum," Sadhana, vol. 36, No. 3 pp. 3390348 (2011).

Ge et al., "Investigation of the partially coherent effects in a 2D Talbot interferometer," Anal. Bioanal. Chem. vol. 401, (2011), pp. 865-870.

Ge et al., "Self-absorption correction on 2D X-ray fluorescence maps," Sci. Rep. 13, p. 7271, https://doi.org/10.1038/s41598-023-33383-w (2023).

Ghani et al., "A Phase Sensitive X-ray Brest Tomosynthesis System: Preliminary Patient Images with Cancer Legions," Phys. Med. Biol. https://doi.org/10.1088/1361-6560/ac2ea6 (2021).

Gironda et al., "Asymmetric Rowland circle geometries for spherically bent crystal analyzers in laboratory and synchrotron applications," J. Anal. At. Spectrom., doi: 10.1039/d3ja00437f (2024).

Gobo et al., "Grating-based spatial harmonic frequency X-ray imaging for quantitative characterization of structures with sub-detector spatial resolution," Measurement, doi: 10.1016/j.measurement.2024.115601 (2024).

Greczynski et al., "Binding energy referencing in X-ray photoelectron spectroscopy," Nature Reviews Mat'ls, doi.org/10.1038/s41578-024-00743-5 (2024).

Graetz et al., "Lenseless X-ray Nano-Tomography down to 150 nm Resolution: On the Quantification of Modulation Transfer and Focal Spot of the Lab-based ntCT System," arXiv:2009.11749v1 [physics.ins-det] Sep. 24, 2020, 10 pages.

Gu et al., "A Breakthrough in Resolution and Scan Speed: Overcome the Challenges of 3D X-ray Imaging Workflows for Electronics Package Failure Analysis," 2023 IEEE Int'l Symp. Phys. and Failure Analysis of Integrated Circuits (IPFA), doi: 10.1109/IPFA58228.2023.10249028 (2023).

Günther et al., "Full-field structured-illumination super-resolution X-ray transmission microscopy," Nature Comm. 10:2494 (2019) and supplementary information.

Gustschin et al., "High resolution and sensitivity bi-directional x-ray phase contrast imaging using 2D Talbot array illuminators," arXiv:2105.07347v1 [physics.med-ph] May 16, 2021.

Harasse et al., "X-ray Phase Laminography with Talbot Interferometer", in Developments in X-Ray Tomography VII, Proc. SPIE vol. 7804 (2010), 780411.

Harasse et al., "Iterative reconstruction in x-ray computed laminography from differential phase measurements", Opt. Express. vol. 19 (2011), pp. 16560-16573.

Harasse et al., "X-ray Phase Laminography with a Grating Interferometer using Iterative Reconstruction", in International Workshop on X-ray and Neutron Phase Imaging with Gratings, AIP Conf. Proc. vol. 1466, (2012), pp. 163-168.

Hashimoto et al., "Improved reconstruction method for phase stepping data with stepping errors and dose fluctuations," Optics Express, vol. 28, No. 11, pp. 16363-16384 (2020).

Haug et al., "A laboratory-based multifunctional near ambient pressure X-ray photoelectron spectroscopy system for electrochemical, catalytic, and cryogenic studies," Rev. Sci. Instr. vol. 94, 065104, https://doi.org/10.1063/5.0151755 (2023).

Hayashi et al., "Wave-dispersive x-ray spectrometer for simultaneous acquisition of several characteristic lines based on strongly and accurately shaped Ge crystals," Rev. Sci. Instr. vol. 79, 033110 (2008).

Heirwegh et al., "The focused beam X-ray fluorescence elemental quantification software package PIQUANT," Spectrochimica Acta Part B: Atomic Spectroscopy, https://doi.org/10/1016/j.sab.2022.106520 (2022).

Helfen et al., "On the Implementation of computed laminography using synchrotron radiation", Rev. Sci. Instr. vol. 82, pp. 063702-1-063702-8 (2011).

Hemraj-Benny et al., "Near-Edge X-ray Absorption Fine Structure Spectroscopy as a Tool for Investigating Nanomaterials," Small, vol. 2(1), (2006), pp. 26-35.

Hennekam et al., "Trace metal analysis of sediment cores using a novel X-ray fluorescence core scanning method," Quaternary Int'l, https://doi.org/10.1016/j.quaint.2018.10.018 (2018).

Hirano et al., "X-ray zooming optics for analyzer-based multi-contrast computed tomography," J. Synch. Rad. vol. 29, https://doi.org/10.1107/S1600577522001412 (2022).

Holberg et al., "High-Resolution Table-Top NEXAFS Spectroscopy," Anal. Chem. https://10.1021/acs.analchem.1c04374 (2022).

Holden et al., "Probing Sulfur Chemical and Electronic Structure with Experimental Observation and Quantitative Theoretical Prediction of K# and Valence-to-Core K# X-ray Emission Spectroscopy," J. Phys. Chem. A doi: 10.1021/acs.jpca.0c04195 (2020).

(56) References Cited

OTHER PUBLICATIONS

Holfelder et al., "A double crystal von Hamos spectrometer for traceable x-ray emission spectroscopy," Rev. Sci. Instrum. vol. 92, p. 123105 (2021).

Hönlcke et al., "Reference-free X-ray fluorescence analysis with a micrometer-sized incident beam," Nanotechnology, https://doi.org/10.1088/1361-6528/ad3aff (2024).

Honma et al., Full-automatic XAFS Measurement System of the Engineering Science Research II beamline BL14B2 at Spring-8, 2011, AIP Conference Proceedings 1234, pp. 13-16.

Hoshino et al., "High-energy X-ray micro-laminography to visualize microstructures in dense planar object," J. Synch. Rad. https://doi.org/10.1107/S1600577522012176 (2022).

Hosseinzadeh et al., "Total-Ionizing-Dose Effects in Integrated Silicon Phase Shifters Using Localized X-Ray Pulses," IEEE Trans. Nucl. Sci., doi.org/10.1109/TNS.2024.3496297 (2024).

Howard et al., "High-Definition X-ray Fluorescence Elemental Mapping of Paintings," Anal. Chem., 2012, vol. 84(7), pp. 3278-3286.

Hu et al., "Improving small animal cone beam CT resolution by mitigating x-ray focal spot induced blurring via deconvolution," Phys. Med. Bio., in press, https://doi.org/10.1088/1361-6560/ac6b7a (2022).

Hui et al., "Stacked Scintillators Based Multispectral X-Ray Imaging Featuring Quantum-Cutting Perovskite Scintillators With 570 nm Absorption-Emission Shift," Adv. Mat'ls doi:10.1002/adma.202416360 (2025).

Ide-Ektessabi et al., "The role of trace metallic elements in neurodegenerative disorders: quantitative analysis using XRF and XANES spectroscopy," Anal. Sci., vol. 21(7) (Jul. 2005), pp. 885-892.

Inoue et al., "Monolithic deformable mirror based on lithium niobate single crystal for high-resolution X-ray adaptive microscopy," Optica, vol. 11, No. 5, pp. 621-625 (2024).

Ishisaka et al., "A New Method of Analyzing Edge Effect in Phase Contrast Imaging with Incoherent X-rays," Optical Review, vol. 7, No. 6, (2000), pp. 566-572.

Ito et al., "A Stable In-Laboratory EXAFS Measurement System," Jap. J. Appl. Phys., vol. 22, No. 2, Feb. 1, 1983, pp. 357-360.

Itoh et al., "Two-dimensional grating-based X-ray phase-contrast imaging using Fourier transform phase retrieval," Op. Express, vol. 19, No. 4 (2011) pp. 3339-3346.

Janssens et al, "Recent trends in quantitative aspects of microscopic X-ray fluorescence analysis," TrAC Trends in Analytical Chemistry 29.6 (Jun. 2010): 464-478.

Jahrman et al., "Vacuum formed temporary spherically and toroidally bent crystal analyzers for x-ray absorption and x-ray emission spectroscopy," Rev. Sci. Inst. vol. 90, 013106 (2019).

Jiang et al., "X-Ray Phase-Contrast Imaging with Three 2D Gratings," Int. J. Biomed. Imaging, (2008), 827152, 8 pages.

Kalasová et al., "Characterization of a laboratory-based X-ray computed nanotomography system for propagation-based method of phase contrast imaging," IEEE Trans. on Instr. and Meas., DOI 10.1109/TIM.2019.2910338 (2019).

Kang et al., "Cold Cathode Flat Panel X-ray Source for Talbot-Lau Grating Interferometer using Zinc Oxide Nanowire Field Emitter Arrays and Periodic Microstructured Anode," ACS Appl. Nano Mater., doi.org/10.1021/acsanm.4c04410 (2024).

Keyrilainen et al., "Phase contrast X-ray imaging of breast," Acta Radiologica, vol. 51 (8), (2010), pp. 866-884.

Khan et al., "Recent Trends in Applications of X-ray Photoelectron Spectroscopy (XPS) Technique in Coatings for Corrosion Protection," Chapter of "Recent Developments in Analytical Techniques for Corrosion Research," I. Toor (ed.), Springer Nature Switzerland AG https://doi.org/10.1007/978-3-030-89101-5_8 (2022).

Kido et al., "Bone Cartilage Imaging with X-ray Interferometry using a Practical X-ray Tube", in Medical Imaging 2010: Physics of Medical Imaging, Proc. SPIE vol. 7622 (2010), 762240.

Kim, "Talbot images of wavelength-scale amplitude gratings," Opt. Express vol. 20(5), (2012), pp. 4904-4920.

Kim et al., "Observation of the Talbot Effect at Beamline 6C Bio Medical Imaging of the Pohang Light Source-II," J. Korean Phys. Soc., vol. 74, No. 10, pp. 935-940 (May 2019).

Kim et al., "A Simulation Study on the Transfer Characteristics of the Talbot Pattern Through Scintillation Screens in the Grating Interferometer," J. Rad. Sci. and Tech. 42(1), pp. 67-75 (2019).

Kiranjot et al., "Surface and interface characterization of Ru/C/Ru trilayer structure using grazing incidence X-ray reflectivity and X-ray fluorescence," Surf. and Interface Analysis, doi: 10.1002/sia7016 (2021).

Kiyohara et al., "Development of the Talbot-Lau Interferometry System Available for Clinical Use", in International Workshop on X-ray and Neutron Phase Imaging with Gratings, AIP Cong. Proc. Vol. 1466, (2012), pp. 97-102.

Klockenkämper et al., "7.1 Instrumental Developments" and "7.3 Future Prospects by Combinations," from Chapter 7 of Total Reflection X-ray Fluorescence Analysis and Related Methods 2nd Ed. (J. Wiley and Sons, Hoboken, NJ, 2015).

Klockenkämper et al., "Chapter 3: Instrumentation for TXRF and GI-XRF," Total Reflection X-ray Fluorescence Analysis and Related Methods 2nd Ed. (J. Wiley and Sons, Hoboken, NJ, 2015).

Kottler et al., "A two-directional approach for grating based differential phase contrast imaging using hard x-rays," Opt. Express vol. 15(3), (2007), pp. 1175-1181.

Kottler et al., "Dual energy phase contrast x-ray imaging with Talbot-Lau interferometer," J. Appl. Phys. vol. 108(11), (2010), 114906.

Kroupa et al., "High contrast laminography using iterative algorithms," 12th Int'l Workshop on Rad. Imag. Detectors, doi: 10.1088/1748-0221/6/01/C01045 (2010).

Kulow et al., "On the Way to Full-Field X-ray Fluorescence Spectroscopy Imaging with Coded Apertures," J. Anal. At. Spectrom. Doi: 10.1039/C9JA00232D (2019).

Kutukova et al., "Laboratory High-Contrast X-ray Microscopy of Copper Nanostructures Enabled by a Liquid-Metal-Jet X-ray Source," Nanomaterials, vol. 14, p. 448 (2024).

Kuwabara et al., "Hard-X-ray Phase-Difference Microscopy with a Low-Brilliance Laboratory X-ray Source", Appl. Phys. Express vol. 4 (2011) 062502.

Leatham et al., "X-ray dark-field and phase retrieval without optics, via the Fokker-Planck equation," arXiv:2122.10999v1, physics.med-ph, Dec. 21, 2021.

Lee et al., "A system design method for signal-to-noise ratio enhancement in single-grating-based X-ray phase-contrast imaging," Nucl. Eng. & Tech., doi: 10.1016/j.net.2025.103482 (2025).

Lei et al., "8-inch-diameter field of view for X-ray differential phase-contrast imaging," Nucl. Inst. and Methods in Physics Research A, https://doi.org/10-1016/j.nima.2021.165375 (2021).

Li et al., "X-ray phase-contrast imaging using cascade Talbot-Lau interferometers," Proc. SPIE 10964 (2018), pp. 1096469-1-1096469-6.

Liao et al., "Design of a full-filled transmission X-ray microscope with 30nm resolution," SPIE Proc. Publ., ChinaXiv:202311.00232v1 (2023).

Lin et al., "Quasi-Monte Carlo method for calculating X-ray scatter in CT," Op. Express, vol. 29, No. 9, p. 13746 (2021).

Lin et al., "High energy x-ray Talbot-Lau interferometer employing a microarray anode-structured target source to extend the field of view," Phys. Med. Biol., doi.org/10.1088/1361-6560/ad0196 (2023).

Lin et al., "A lab-based micro X-ray fluorescence spectrometer with high photon flux and spatial resolution for ancient ceramic research," J. Anal. At. Spectrom., doi: 10.1039/D4JA00319E (2025).

Linsen et al., "Single X-ray Projection Material Decomposition using a Mesh Projector," 14th Conf. Ind. Comp. Tomography, Antwerp, Belgium (ICT 2025) e-Journal of Nondestructive Testing, doi: 10.58286/30756 (2025).

Lohmann et al., "An interferometer based on the Talbot effect," Optics Communications vol. 2 (1971), pp. 413-415.

Longo et al., "Flexible Plenoptic X-ray Microscopy," Photonics, vol. 9, p. 98 (2022).

Lübcke et al., "Soft X-ray nanoscale imaging using a sub-pixel resolution charge coupled device (CCD) camera," Rev. Sci. Instrum. vol. 90, 043111 (2019).

(56) References Cited

OTHER PUBLICATIONS

Lucht et al., "Phase retrieval beyond the homogeneous object assumption for X-ray in-line holographic imaging," arXiv:2403.00461v1 [eess.IV] (2024).

Lühl et al., "Scanning transmission X-ray microscopy with efficient X-ray fluorescence detection (STXM-XRF) for biomedical applications in the soft and tender energy range," J. Synch. Rad. vol. 26, https://doi.org/10.1107/S1600577518016879, (2019).

Ma et al., "Exploration and Research of High Contrast and High Resolution Two-dimensional X-Ray Grids," Sixth Conf. Frontiers in Op. Imaging and Tech., Proc. SPIE vol. 13153, doi: 10.1117/12.3014459 (2024).

Maisl et al., "Computed Laminography for X-ray Inspection of Lightweight Constructions," 2nd Int'l Symp. on NDT in Aerospace 2010—Mo.3.A.3, https://www.ndt.net/?id+10375 (2010).

Mäkinen et al., "Optimization of contrast and dose in X-ray phase-contrast tomography with a Talbot-Lau interferometer," Biomed. Phys. Eng. Express, doi: 10.1088.2057-1976/ad5206 (2024).

Malzer et al., "A laboratory spectrometer for high throughput X-ray emission spectroscopy in catalysis research," Rev. Sci. Inst. 89, 113111 (2018).

Mamyrbayev et al., "Staircase array of inclined refractive multi-lenses for large field of view pixel super-resolution scanning transmission hard X-ray microscopy," J. Synch. Rad., vol. 28 https://doi.org/10.1107/S1600577521001521 (2021).

Masteghin et al., "Benchmarking of X-Ray Fluorescence Microscopy with Ion Beam Implanted Samples Showing Detection Sensitivity of Hundreds of Atoms," Small Methods, doi: 10.1002/smtd.202301610 (2024).

Matsunaga et al., "Development of projection X-ray microscope with 10 nm spot size," Nodestr. Test. and Eval., https://doi.org.10.1080/10589759.2022.2083616 (2022).

Matsuyama et al., "Wavefront measurement for a hard-X-ray nanobeam using single-grating interferometry", Opt. Express vol. 20 (2012), pp. 24977-24986.

Matveevskii et al., "Laboratory-based 3D X-ray standing-wave analysis of nanometre-scale gratings," J. Appl. Crystallography, vol. 57, doi.org/10.1107/S1600576724007179 (2024).

Mcrae et al., "In Situ Imaging of Metals in Cells and Tissues," Chem Rev. vol. 109, doi:10.1021/cr900223a (2009).

Menzies et al., "Dual source X-ray and electron SEM system: Elemental mapping of an Epithermal gold-bearing sample from Karangahake, New Zealand," Microsc. Microanal., vol. 27 (Suppl. 1), pp. 456 (2021).

Miao et al., "Motionless phase stepping in X-ray phase contrast imaging with a compact source," Proceedings of the National Academy of Sciences, vol. 110(48), (2013), pp. 19268-19272.

Miao et al., "A four-grating interferometer for x-ray multi-contrast imaging," Med. Physics, doi: 10.1002/mp.17052 (2024).

Mijovilovich et al., "Analysis of trace metal distribution in plants with lab-based microscopic X-ray fluorescence imaging," Plant Methods, vol. 16, No. 82, 21 pages (2020).

Mizutani et al., X-ray microscopy for neural circuit reconstruction in 9th International Conference on X-Ray Microscopy, J. Phys: Conf. Ser. 186 (2009) 012092.

Modregger et al., "Grating-Based X-ray Phase Contrast Imaging," Ch. 3 of Emerging Imaging|Technologies in Medicine, M. Anastasio & P. La Riviere, ed., CRC Press, Boca Raton, FL, (2012), pp. 43-56.

Momose et al., "Phase-Contrast X-Ray Imaging Using an X-Ray Interferometer for Biological Imaging", Analytical Sciences vol. 17 Supplement (2001), pp. i527-i530.

Momose et al., "Demonstration of X-Ray Talbot Interferometry", Jpn. J. Appl. Phys. vol. 42 (2003), pp. L866-L868.

Momose et al., "Phase Tomography Using an X-ray Talbot Interferometer", in Developments in X-Ray Tomography IV, Proc. SPIE vol. 5535 (2004), pp. 352-360.

Momose, "Recent Advances in X-ray Phase Imaging", Jpn. J. Appl. Phys. vol. 44 (2005), pp. 6355-6367.

Momose et al., "Biomedical Imaging by Talbot-Type X-Ray Phase Tomography" in Developments in X-Ray Tomography V, Proc. SPIE vol. 6318 (2006) 63180T.

Momose et al., "Phase Tomography by X-ray Talbot Interferometry for Biological Imaging" Jpn. J. Appl. Phys. Vol. 45 2006 pp. 5254-5262.

Momose et al., "X-ray Talbot Interferometry with Capillary Plates", Jpn. J. Appl. Phys. vol. 45 (2006), pp. 314-316.

Momose et al., "Phase Imaging with an X-ray Talbot Interferometer", Advances in X-ray Analysis vol. 49(3) (2006), pp. 21-30.

Momose et al., "Phase Tomography Using X-ray Talbot Interferometer", in Synchrotron Radiation Instrumentation: Ninth International Conference, AIP Conf. Proc. vol. 879 (2007), pp. 1365-1368.

Momose et al., "Sensitivity of X-ray Phase Imaging Based on Talbot Interferometry", Jpn. J. Appl. Phys. vol. 47 (2008), pp. 8077-8080.

Momose et al., "Grating-Based X-ray Phase Imaging Using Multiline X-ray Source", Jpn. J. Appl. Phys. Vol. 48 (2009), 076512.

Momose et al., "X-ray phase tomography with a Talbot interferometer in combination with an X-ray imaging microscope", in 9th International Conference on X-Ray Microscopy, J. Phys: Conf. Ser. 186 (2009) 012044.

Momose et al., "High-speed X-ray phase imaging and X-ray phase tomography with Talbot interferometer and white synchrotron radiation", Opt. Express vol. 17 (2009), pp. 12540-12545.

Momose et al., "X-Ray Phase Imaging with Talbot Interferometry", in "Biomedical Mathematics: Promising Directions in Imaging, Therapy Planning, and Inverse Problems", Y. Censor, M. Jiang & G. Wang, eds. (Medical Physics Publishing, Madison, WI, USA, 2010), pp. 281-320.

Momose et al., "X-ray Phase Measurements with Talbot Interferometry and Its Applications", in International Conference on Advanced Phase Measurement Methods in Optics and Imaging, AIP Conf. Proc. vol. 1236 (2010), pp. 195-199.

Momose et al., "X-ray Phase Imaging Using Lau Effect", Appl. Phys. Express vol. 4 (2011) 066603.

Momose et al., "Four-dimensional X-ray phase tomography with Talbot interferometry and white synchrotron radiation: dynamic observation of a living worm", Opt. Express vol. 19 (2011), pp. 8423-8432.

Momose et al., "X-ray Phase Imaging—From Static Observation to Dynamic Observation-", in International Workshop on X-ray and Neutron Phase Imaging with Gratings AIP Conf. Proc. vol. 1466, (2012), pp. 67-77.

Momose et al., "Recent Progress in X-ray and Neutron Phase Imaging with Gratings," Quantum Beam Science, vol. 4, No. 9; doi:10.3390/qubs4010009 (2020).

Momose et al., "Development of grating-based super-resolution x-ray phase imaging," AIP Conf. Proc. 2990, 030003 (2023).

Momose et al., "Signal enhancement in X-ray Talbot interferometry with a pair of concave and convex parabolic phase gratings," Appl. Phys. Express, doi.org/10.35848/1882-0786/ad9665 (2024).

Morimoto et al., "X-ray phase contrast imaging by compact Talbot-Lau interferometer with a signal transmission grating," 2014, Optics Letters, vol. 39, No. 15, pp. 4297-4300.

Morimoto et al., "Design and demonstration of phase gratings for 2D single grating interferometer," Optics Express vol. 23, No. 23, 29399 (2015).

Morvay, "Chemical composition depth profiling of thin films using x-ray reflectometry and fluorescence," Ph.D. thesis, Masaryk University, Brno, Czech Republic (2024).

Munro et al., Design of a novel phase contrast imaging system for mammography, 2010, Physics in Medicine and Biology, vol. 55, No. 14, pp. 4169-4185.

Nakamura et al., "Nanoscale X-ray Tomography of Integrated Circuits using a Hybrid Electron/X-ray Microscope: Results and Prospects," 2023 IEEE Phys. Assurance and Inspection of Electron., doi: 10.1109/PAINE58317.2023.10318004 (2023).

Nango et al., "Talbot-defocus multiscan tomography using the synchrotron X-ray microscope to study the lacuno-canalicular network in mouse bone", Biomed. Opt. Express vol. 4 (2013), pp. 917-923.

Nemeth et al., "Laboratory von Hamos X-ray Spectroscopy for Routine Sample Characterization," arvix:1607.08045v1 (2016).

(56) References Cited

OTHER PUBLICATIONS

Neuhausler et al., "Non-destructive high-resolution X-ray imaging of ULSI micro-electronics using keV X-ray microscopy in Zernike phase contrast," Microelectronic Engineering, Elsevier Publishers BV., Amsterdam, NO, vol. 83, No. 4-9 (Apr. 1, 2006) pp. 1043-1046.
Newville, "Fundamentals of XAFS," (Univ. of Chicago, Chicago, IL, Jul. 23, 2004).
Nguyen et al., "Data-Efficient Deep Learning for Printed Circuit Board Defect Detection Using X-Ray Images," J. IEEE vol. 14, No. 8, pp. 1-14 (2021).
Novichkov et al., "Laboratory-based X-ray spectrometer for actinide science," J. Synch. Rad. vol. 30, doi.org/10.1107/S1600577523006926 (2023).
Nykanen et al., "X-ray scattering in full-field digital mammography," Med. Phys. vol. 30(7), (2003), pp. 1864-1873.
O'Brien et al., "Recent Advances in X-ray Cone-beam Computed Laminography," J. X-ray Sci. and Tech., vol. 24, No. 5, pp. 691-707 (2016).
Ohba et al., "Laboratory-size x-ray microscope using Wolter mirror optics and an electron-impact x-ray source," Rev. Sci. Inst. 92, 093704 (2021).
Oji et al., Automatic XAFS measurement system developed at BL14B2 in SPring-8, Available online Nov. 15, 2011, Journal of Synchrotron Radiation, vol. 19, pp. 54-59.
Okolo, "A guide into the world of high-resolution 3D imaging: the case of soft X-ray tomography for the life sciences," Biochem. Soc. Trans., https://doi.org/10.1042/BST20210886 (2002).
Olbinado et al., "Demonstration of Stroboscopic X-ray Talbot Interferometry Using Polychromatic Synchrotron and Laboratory X-ray Sources", Appl. Phys. Express vol. 6 (2013), 096601.
Ortega et al., "Bio-metals imaging and speciation in cells using proton and synchrotron radiation X- ray microspectroscopy," J. Royal Society Interface vol. 6 suppl. 5 (Oct. 6, 2009), p. 6S649-58.
Pandeshwar et al., "Envelope modulated x-ray grating interferometry," Appl. Phys. Lett. 120, 193701 (2022).
Pandeshwar et al., "Modeling of beam hardening effects in a dual-phase X-ray grading interferometer for quantitative dark-field imaging," Optics Express, vol. 28, No. 13, Jun. 22, 2020, pp. 19187-19204 (2020).
Parrill et al., "GISAXS—Glancing Incidence Small Angle X-ray Scattering," Journal de Physique IV, vol. 3 (Dec. 1993), pp. 411-417.
Pasikatan, "Characterization and measurement limitations using non-destructive mueller matrix scatterometry (MMSE) and x-ray diffraction (XXRD) techniques for gate all around (GAA) transistor test structures: Limitations and superlattice effects in advanced Si/Si(1-x)Ge(x) superlattice nanowire test structures and measureability of simulated horizontal GAA test structures," Electronic Theses & Dissertations (2024-present), 109 (2024).
Paunesku et al., "X-Ray Fluorescence Microprobe Imaging in Biology and Medicine," J. Cell. Biochem. vol. 99, pp. 1489-1502 (2006).
Pekel et al., "Geometric calibration of seven degree of freedom robotic sample holder for x-ray CT," Proc. of SPIE 12304, 7th Int'l Conf. on Image Formation in X-Ray Computed Tomography, 123042L, doi: 10.1117/12.2646492 (2022).
Perez et al., "Phase Contrast Based High Resolution X-Ray Desktop Tomography," Rad. Phys. and Chem. Doi: 10.1016/j.radphyschem.2025.112600 (2025).
Pfeiffer et al., "Phase retrieval and differential phase-contrast imaging with low-brilliance X-ray sources," Nature Physics vol. 2, (2006), pp. 258-261.
Pfeiffer et al., "Hard x-ray phase tomography with low brilliance x-ray sources," Phys. Rev. Lett. vol. 98, (2007), 108105.
Pfeiffer et al., "Hard-X-ray dark-field imaging using a grating interferometer," Nature Materials vol. 7, (2008), pp. 134-137.
Pfeiffer, "Milestones and basic principles of grating-based x-ray and neutron phase-contrast imaging," in International Workshop on X-ray and Neutron Phase Imaging with Gratings AIP Conf. Proc. vol. 1466, (2012), pp. 2-11.
Pianetta et al., "Application of synchrotron radiation to TXRF analysis of metal contamination on silicon wafer surfaces," Thin Solid Films, vol. 373(1-2), 2000, pp. 222-226.
Pieper et al., "Total-Ionizing Dose Damage from X-Ray PCB Inspection Systems," 2024 IEEE Int'l Reliability Physics Symp. (IRPS), doi: 10.1109/IRPS48288.2024.10529337 (2024).
Potts, "Electron Probe Microanalysis", Ch. 10 of "A Handbook of Silicate Rock Analysis" (Springer Science + Business Media, New York, 1987), pp. 326-382.
Prewett et al., "Focused ion beam repair: staining of photomasks and reticles," J. Phys. D Appl. Phys. vol. 26 (1993), pp. 1135-1137.
Prewett et al., "Gallium Staining in FIB Repair of Photomasks," Microelectronic Engineering, vol. 21 (1993), pp. 191-196.
Prewett et al., "FIB Repair of 5X Reticles and Effects on IC Quality," Integrated Circuit Metrology, Inspection, and Process Control VII, Proc. SPIE vol. 1926 (1993), pp. 517-526.
Pushie et al., "Prion protein expression level alters regional copper, iron and zinc content in the mouse brain," Metallomics vol. 3, 206-214 (2011).
Pushie et al., "Elemental and Chemically Specific X-ray Fluorescence Imaging of Biological Systems," Chem. Rev. 114:17, 8499-8541 (2014).
Qiao et al., "Single-shot x-ray phase-contrast and dark-field imaging based on coded binary phase mask," Appl. Phys. Lett. 119, 011105 (2021).
Qin et al., "Trace metal imaging with high spatial resolution: Applications in biomedicine," Metallomics, vol. 3 (Jan. 2011), pp. 28-37.
Redus et al., "Spectrometer configuration and measurement uncertainty in X-ray spectroscopy," X-Ray Spectrom., pp. 1-14 (2020).
Renaud et al., "Probing surface and interface morphology with Grazing Incidence Small Angle X-ray Scattering," Surface Science Reports, vol. 64:8 (2009), pp. 255-380.
Rix et al., "Super-Resolution X-ray phase-contrast and dark-field imaging with a single 2D grating and electromagnetic source stepping," Phys. Med. Biol. In press https://doi.org/10.1088/1361-6560/ab2ff5 (2019).
Roter et al., "Multifunctional bending magnet beamline with a capillary optic for X-ray fluorescence studies of metals in tissue sections," doi: 10.1101/2025.01.18.633695 (2025).
Rutishauser, "X-ray grating interferometry for imaging and metrology," 2003, Eth Zurich, Diss. ETH No. 20939.
Sato et al., Two-dimensional gratings-based phase-contrast imaging using a conventional x-ray tube, 2011, Optics Letters, vol. 36, No. 18, pp. 3551-3553.
Scherer et al., "Bi-Directional X-Ray Phase-Contrast Mammography," PLoS One, vol. 9, Issue 5 (May 2014) e93502.
Scholze et al., "X-ray Detectors and XRF Detection Channels," Ch. 4 of "Handbook of Practical X-Ray Fluorescence Analysis," B. Beckhoff et al., eds. (Springer, Berlin Heidelberg, Germany, 2006), pp. 85-198.
Schunck et al., "Soft x-ray imaging spectroscopy with micrometer resolution," Optica vol. 8, No. 2, pp. 156-160 (2021).
Seddon-Ferretti et al., "HERMES—a GUI-based software tool for pre-processing of X-ray absorption spectroscopy data from laboratory Rowland circle spectrometers," J. Synch. Rad., vol. 29, https://doi.org/10.1107/S1600577521012583, pp. 1-4 (2022).
Sefi et al., "25-Fold Resolution Enhancement of X-ray Microscopy Using Multipixel Ghost Imaging," arXiv:2402.14023 (2024).
Seifert et al., "Talbot-Lau x-ray phase-contrast setup for fast scanning of large samples," Sci. Rep. 9:4199, pp. 1-11 (2019).
Shafkat et al., "Assessing Compatibility of Advanced IC Packages to X-Ray Based Physical Inspection," Elec. Device Failure Analysis, vol. 26, No. 3, pp. 14-24 (2024).
Shi et al., "Laboratory X-ray interferometry imaging with a fan-shaped source grating," Optics Lett., doi.org/10.1364/OL.426867 (2021).

(56) References Cited

OTHER PUBLICATIONS

Shimamura et al., "Soft X-ray nanobeams formed by aberration-reduced elliptical mirrors with large numerical aperture," Opt. Express, vol. 31, No. 23, 38132 (2023).
Shimura et al., "Hard x-ray phase contrast imaging using a tabletop Talbot-Lau interferometer with multiline embedded x-ray targets", Opt. Lett. vol. 38(2) (2013), pp. 157-159.
Simionovici et al., "X-ray focusing methods for X-ray absorption spectroscopy," Int'l Tables Crystallog. vol. I, https://doi.org/10.1107/S1574870721006844 (2022).
Six et al., "Joint multi-contrast CT for edge illumination X-ray phase contrast imaging using split Barzilai-Borwein steps," Op. Express, vol. 32, No. 2, pp. 1135-1150 (2024).
Soltau et al., "Coherent Diffractive Imaging with Diffractive Optics," Phys. Rev. Lett. 128, 223901 (2022).
Sparks Jr., "X-ray Fluorescence Microprobe for Chemical Analysis," in Synchrotron Radiation Research, H. Winick & S. Doniach, eds. (Plenum Press, New York, NY 1980), pp. 459-512.
Stampanoni et al., "The First Analysis and Clinical Evaluation of Native Breast Tissue Using Differential Phase-Contrast Mammography," Investigative Radiology, vol. 46, pp. 801-806. pub 2011-12-xx.
Storm et al., "Optimizing the energy bandwidth for transmission full-field X-ray microscopy experiments," J. Synch. Rad., vol. 29, https://doi.org/10.1107/S1600577521011206, pp. 1-10 (2022).
Streli et al., "Micro-X-ray fluorescence spectroscopy," Chapter 1.9.f of "Imaging Modalities for Biological and Preclinical Research: A compendium, vol. 1, Part I: Ex vivo biological imaging," Ed. Walter et al., 8 pages, doi:10.1088/978-0-7503-3059-6ch42 (2021).
Su et al., "Quantitative Dual-Energy X-ray Imaging Based on K-Edge Absorption Difference," J. Phys. Chem. Lett. vol. 14, pp. 10074-10079 (2023).
Sunday et al., "X-ray Metrology for the Semiconductor Industry Tutorial," J. Res. Nat'l Inst. Stan. vol. 124: 124003 (2019); https://doi.org/10.6028/jres.124.003.
Takeda et al., "X-Ray Phase Imaging with Single Phase Grating", Jpn. J. Appl. Phys. vol. 46 (2007), pp. L89-L91.
Takeda et al., "Differential Phase X-ray Imaging Microscopy with X-ray Talbot Interferometer" Appl. Phys. Express vol. 1 (2008) 117002.
Talbot, "Facts relating to optical science No. IV," Philos. Mag. vol. 9 (1836), pp. 401-407.
Tanaka et al., "Cadaveric and in vivo human joint imaging based on differential phase contrast by X-ray Talbot-Lau interferometry", Z. Med. Phys. vol. 23 (2013), pp. 222-227.
Tanaka et al., "Propagation-based phase-contrast imaging method for full-field X-ray microscopy using advanced Kirkpatrick-Baez mirrors," Op. Express vol. 31, No. 16, pp. 26135-26144 (2023).
Tang et al., "Detailed analysis of the interference patterns measured in lab-based X-ray dual-phase grating interferometry through wave propagation simulation," Opt. Ex. vol. 31, No. 2, pp. 1677-1691 (2023).
Tao et al., "Moire artifacts reduction in Talbot-Lau X-ray phase contrast imaging using a three-step iterative approach," Opt. Ex. vol. 30, No. 20, pp. 35096-35111 (2022).
Tao et al., "Factors Affecting the Spatial Resolution in 2D Grating-Based X-Ray Phase Contrast Imaging," Frontiers in Physics, doi: 10.3389/fphy.2021.672207 (2021).
Taphorn et al., "Grating-based spectral X-ray dark-field imaging for correlation with structural size measures," Sci. Reports, vol. 10, 13195 (2020).
Tebina et al., "X-Ray Fault Injection: Reviewing Defensive Approaches from a Security Perspective," 2022 IEEE Int'l Symp. Defect and Fault Tolerances in VLSI and Nanotechnology Systems (DFT), doi: 10.1109/DFT56152.2022.9962362 (2022).
Terzano et al., Recent advances in analysis of trace elements in environmental samples by X-ray based techniques (IUPAC Technical Report), Pure Appl. Chem. 2019.
Tessarini et al., "Semi-classical Monte Carlo algorithm for the simulation of X-ray grating interferometry," Sci. Rep. vol. 12, p. 2485 (2022).
Tetef et al., "Unsupervised Machine Learning for Unbiased Chemical Classification in X-ray Absorption Spectroscopy and X-ray Emission Spectroscopy," Royal Soc. of Chem. Doi: 10.33774/chemrxiv-2021-5tvrv (2021).
Titus et al., "Advancing the in-situ characterization of light elements via X-ray absorption spectroscopy using superconducting detectors," Microsc. Microanal., vol. 27, (Suppl. 1), pp. 2890 (2021).
Tkachuk et al., "High-resolution x-ray tomography using laboratory sources", in Developments in X-Ray Tomography V, Proc. SPIE 6318 (2006): 631810.
Tkachuk et al., "Multi-length scale x-ray tomography using laboratory and synchrotron sources", Microsc. Microanal. vol. 13 (Suppl. 2) (2007), pp. 1570-1571.
Töpperwien et al., "Multiscale x-ray phase-contrast tomography in a mouse model of transient focal cerebral ischemia," Biomed. Op. Express, vol. 10, No. 1, Jan. 2019, pp. 92-103.
Tsuji et al., "X-Ray Spectrometry: Recent Technological Advances," John Wiley & Sons Ltd. Chichester, West Sussex, UK 2004), Chapters 1-7.
Udagawa, "An Introduction to In-House EXAFS Facilities," The Rigaku Journal, vol. 6, (1) (1989), pp. 20-27.
Udagawa, "An Introduction to X-ray Absorption Fine Structure," The Rigaku Journal, vol. 11(2)(1994), pp. 30-39.
Uehara et al., "Effectiveness of X-ray grating interferometry for non-destructive inspection of packaged devices", J. Appl. Phys. vol. 114 (2013), 134901.
Viermetz et al., "High resolution laboratory grating-based X-ray phase-contrast CT," Scientific Reports 8:15884 (2018).
Vila-Comamala et al., "High sensitivity X-ray phase contrast imaging by laboratory grating-based interferometry at high Talbot order geometry," Op. Express vol. 29, No. 2, pp. 2049-2064 (2021).
Villarraga-Gómez et al., "Assessing Electronic Devices with Advanced 3D X-ray Imaging and Electron Microscopy" (2023).
Villarraga-Gómez et al., "Assessing Electronics with Advanced 3D X-ray Imaging Techniques, Nanoscale Tomography, and Deep Learning," J. Fail. Anal. and Preven., https://doi.org/10.1007/s11668-024-01989-5 (2024).
Vogt, "X-ray Fluorescence Microscopy: A Tool for Biology, Life Science and Nanomedicine," Presentation on May 16, 2012 at James Madison Univ., Harrisonburg, VA (31 slides), 2012.
Wan et al., "Fabrication of Multiple Slit Using Stacked-Sliced Method for Hard X-ray Talbot-Lau Interferometer", Jpn. J. Appl. Phys. vol. 47 (2008), pp. 7412-7414.
Wang et al., "Advantages of intermediate X-ray energies in Zernike phase contrast X-ray microscopy," Biotech. Adv., vol. 31 (2013) pp. 387-392.
Wang, "Recent advances in X-ray grating-based dark-field imaging," Trends in Analytical Chemistry, doi.org/10.1016/j.trac.2024.118052 (2024).
Watanabe et al., "X-ray fluorescence micro-tomography and laminography using an x-ray scanning microscope," J. Phys: Conf. Series 186, 012022 (2009).
Watts et al., "The development of laboratory-based high energy sources for XPS," Surf. Interface Anal., pp. 1-17, doi:10.1002/sia.7300 (2023).
Weitkamp et al., "Hard X-ray phase imaging and tomography with a grating interferometer," Proc. SPIE vol. 5535, (2004), pp. 137-142.
Weitkamp et al., "X-ray phase imaging with a grating interferometer," Opt. Express vol. 13(16), (2005), pp. 6296-6304.
Weitkamp et al., "X-ray wavefront analysis and optics characterization with a grating interferometer," Appl. Phys. Lett. vol. 86, (2005), 054101.
Weitkamp et al., Tomography with grating interferometers at low-brilliance sources, 2006, SPIE, vol. 6318, pp. 0S-1 to 0S-10.
Weitkamp et al., "X-ray wavefront diagnostics with Talbot interferometers," International Workshop on X-Ray Diagnostics and Scientific Application of the European XFEL, Ryn, Poland, (2010), 36 slides.

(56) References Cited

OTHER PUBLICATIONS

Weitkamp et al., "Design aspects of X-ray grating interferometry," in International Workshop on X-ray and Neutron Phase Imaging with Gratings AIP Conf. Proc. vol. 1466, (2012), pp. 84-89.

Wen et al., "Fourier X-ray Scattering Radiography Yields Bone Structural Information," Radiology, vol. 251 (2009) pp. 910-918.

Wen et al., "Single-shot x-ray differential phase-contrast and diffraction imaging using two-dimensional transmission gratings," Op. Lett. vol. 35, No. 12, (2010) pp. 1932-1934.

Wirtensohn et al., "The Dark Side of Transmission X-Ray Microscopy," arXiv:2403.18884v1 [physics.optics[ Mar. 27, 2024.

Wirtensohn et al., "Nanoscale dark-field imaging in full-field transmission X-ray microscopy," Optica vol. 11, No. 6, doi.org/10.1364/optica.524812 (2024).

Wilde et al., "Modeling of an X-ray grating-based imaging interferometer using ray tracing," Op. Express vol. 28, No. 17, p. 24657 (2020).

Wilde et al., "Statistical optics modeling of dark-field scattering in X-ray grating interferometers: Part 1. Theory," Op. Express vol. 29, No. 25, p. 40891 (2021).

Wilde et al., "Statistical optics modeling of dark-field scattering in X-ray grating interferometers: Part 2. Simulation," Op. Express vol. 29, No. 25, p. 40917 (2021).

Withers et al., "X-ray computed tomography," Nature Reviews | Methods Primers, vol. 1, No. 18, pp. 1-21 (2021).

Witte et al., "From 2D Stxm to 3D Imaging: Soft X-ray Laminography of Thin Specimens," Nano Lett. Vol. 20, pp. 1305-1314 (2020).

Wittry et al., "Properties of fixed-position Bragg diffractors for parallel detection of x-ray spectra," Rev. Sci. Instr. vol. 64, pp. 2195-2200 (1993).

Wobrauschek et al., "Micro XRF of light elements using a polycapillary lens and an ultra-thin window Silicon Drift Detector inside a vacuum chamber," 2005, International Centre for Diffraction Data 2005, Advances in X-ray Analysis, vol. 48, pp. 229-235.

Wobrauschek et al., "Energy Dispersive, X-Ray Fluorescence Analysis," Encyclopedia of Analytical Chemistry, R.A. Meyers, Ed. (Wiley 2010).

Woicik et al., "Soft X-ray absorption spectra," Int. Tables Crystallogr. vol. 1, https://doi.org.10.1107/51574870720008484 (2023).

Xiao et al., "TXM-Sandbox: an open-source software for transmission X-ray microscopy data analysis," J. Synch. Rad., vol. 29, https://doi.org/10.1107/S1600577521011978, p. 1-10 (2022).

Xu et al., "Synchrotron radiation computed laminography for polymer composite failure studies," J. Synch. Rad., vol. 17, pp. 222-226 (2010).

Xu et al., "Comparison of image quality in computed laminography and tomography," Op. Express, vol. 20, No. 2, pp. 794-806 (2012).

Xu et al., "A versatile high-speed x-ray microscope for sub-10 nm imaging," Rev. Sci. Instr. vol. 95, p. 113705, doi.org/10.1063/5.0225904 (2024).

Yamada et al., "Compact full-field hard x-ray microscope based on advanced Kirkpatrick-Baez mirrors," Optica, vol. 7, No. 4 pp. 367-370 (2020).

Yang et al., "Non-linear super-resolution computed tomography imaging algorithm based on a discrete X-ray source focal spot model," Op. Express, vol. 32, No. 25, pp. 44452-44477 (2024).

Yashiro et al., "Optimal Design of Transmission Grating for X-ray Talbot Interferometer", Advances in X-ray Analysis vol. 49(3) (2006), pp. 375-379.

Yashiro et al., "Efficiency of capturing a phase image using cone-beam x-ray Talbot interferometry", J. Opt. Soc. Am. A vol. 25 (2008), pp. 2025-2039.

Yashiro et. al., "Hard-X-Ray Phase-Difference Microscopy Using a Fresnel Zone Plate and a Transmission Grating", Phys. Rev. Lett. vol. 103 (2009), 180801.

Yashiro et al., "Hard x-ray phase-imaging microscopy using the self-imaging phenomenon of a transmission grating", Phys. Rev. A vol. 82 (2010), 043822.

Yashiro et al., "On the origin of visibility contrast in x-ray Talbot interferometry", Opt. Express (2010), pp. 16890-16901.

Yashiro et al., "X-ray Phase Imaging Microscopy using a Fresnel Zone Plate and a Transmission Grating", in The 10th International Conference on Synchrotron Radiation Instrumentation, AIP Conf. Proc. vol. 1234 (2010), pp. 473-476.

Yashiro et al., "Distribution of unresolvable anisotropic microstructures revealed in visibility-contrast images using x-ray Talbot interferometry", Phys. Rev. B vol. 84 (2011), 094106.

Yashiro et al., "X-ray Phase Imaging and Tomography Using a Fresnel Zone Plate and a Transmission Grating", in "The 10th International Conference on X-ray Microscopy Radiation Instrumentation", AIP Conf. Proc. vol. 1365 (2011) pp. 317-320.

Yashiro et al., "Theoretical Aspect of X-ray Phase Microscopy with Transmission Gratings" in International Workshop on X-ray and Neutron Phase Imaging with Gratings, AIP Conf. Proc. vol. 1466, (2012), pp. 144-149.

Yoshioka et al., "Imaging evaluation of the cartilage in rheumatoid arthritis patients with an x-ray phase imaging apparatus based on Talbot-Lau interferometry," Scientific Reports, 10:6561, https://doi.org/10.1038/s41598-020-63155-9 (2020).

Yuan at al., "Micro X-ray fluorescence device based on monocapillary ellipsoidal lens for thin film thickness measurements," Nucl. Inst. Meth. Phys. Res. A, vol. 1058, p. 168923 (2024).

Zan et al., "High-resolution multicontrast tomography with an X-ray microarray anode-structured target source," PNAS, doi.org10.1073/pnas.2103126118 (2021).

Zanette et al., "Two-Dimensional X-Ray Grating interferometer," Phys. Rev. Lett. vol. 105 (2010) pp. 248102-1 248102-4.

Zeeshan et al., "In-house setup for laboratory-based x-ray absorption fine structure spectroscopy measurements," Rev. Sci. Inst. 90, 073105 (2019).

Zeng et al., "Glass Monocapillary X-ray Optics and Their Applications in X-Ray Microscopy," X-ray Optics and Microanalysis: Proceedings of the 20th International Congress, AIP Conf. Proc. vol. 1221, (2010), pp. 41-47.

Zeng et al., "Restoration of X-ray phase-contrast imaging based on generative adversarial networks," Sci. Rep. doi.org/10/1030/s41598-024-77937-y (2024).

Zhan et al., "A Lightweight Method for Detecting IC Wire Bonding Defects in X-ray Images," Micromachines, vol. 14, p. 1119, https://doi.org/10.3390/mi14061119 (2023).

Zhang et al., "Application of confocal X-ray fluorescence based on capillary X-ray optics in nondestructively measuring the inner diameter of monocapillary optics," Optics Comm. (2018) https://doi.org/10.1016/j.optcom.2018.11.064.

Zhang et al., "Measurement of the inner diameter of monocapillary with confocal X-ray scattering technology based on capillary X-ray optics," Appl. Opt. (Jan. 8, 2019), doc ID 351489, pp. 1-10.

Zhang et al., "Laboratory-scale X-ray absorption spectrometer with a cylindrical Johansson crystal analyzer," Nuclear Inst. and Methods in Physics Research, A (2023), doi: https://doi.org/10.1016/j.nima.2023.168067 (2023).

Zhang et al., "Hard X-ray projection imaging below 5 nm resolution," https://doi.org/10.21203/rs.3.rs-4093473/v1 (2024).

Zhang et al., "Fast and efficient hard X-ray projection imaging below 10 nm resolution," Op. Express, vol. 32, No. 17, pp. 30879-30897 (2024).

Zhang et al., "Virtual X-ray critical dimension metrology via Monte Carlo simulation," Op. Lett. vol. 49, No. 22, pp. 6569-6572 (2024).

Zhao et al., "X-ray wavefront sensing and optics metrology using a microfocus x-ray grating interferometer with electromagnetic phase stepping," Appl. Phys. Lett. 120, 181105 (2022).

Zhao et al., "Applications of the non-negative least-squares deconvolution method to analyze energy-dispersive x-ray fluorescence spectra," Appl. Op., vol. 62, No. 20, pp. 5556-5564 (2023).

Zhou et al., "X-ray wavefront characterization with grating interferometry using an x-ray microfocus laboratory source," Proceedings, vol. 11492, Advances in Metrology for X-Ray and EUV Optics IX; 114920Q, https://doi.org/10.1117/12.2576152 (2020).

Zhu et al., "Optical Wafer Defect Inspection at the 10 nm Technology Node and Beyond," 2022 Int. Extrem. Manuf. In press https://doi.org/10.1088/2631-7990/ac64d7 (2022).

(56) References Cited

OTHER PUBLICATIONS

International Search Report and Written Opinion for Internation Application No. PCT/US2025/011875, mailed May 12, 2025.

\* cited by examiner

SEQUENTIAL ARRAY OF X-RAY IMAGING DETECTORS

CLAIM OF PRIORITY

This application claims the benefit of priority to U.S. Provisional Appl. No. 63/622,240 filed Jan. 18, 2024, which is incorporated in its entirety by reference herein.

BACKGROUND

Field

This application relates generally to x-ray analysis and/or imaging systems.

Description of the Related Art

Three classes of x-ray imaging detectors are widely used. For high spatial resolution applications (e.g., resolution better than 10 microns; resolution down to sub-microns), a first class of x-ray imaging detectors utilize indirect x-ray imaging and typically comprise a scintillator screen that converts the x-ray image into an optical image, and an optical lens system (e.g., a microscope objective or a camera lens) that relays the optical image to a charge-coupled device (CCD) detector or a complementary metal-oxide-semiconductor (CMOS) camera which records the relayed optical image. This first class of x-ray imaging detectors can exhibit a low x-ray detection efficiency resulting from low x-ray stopping power of scintillator screens: thin scintillators (e.g., microns thick) with an optical lens system having a small depth-of-field, especially for high energy x-rays (e.g., x-ray energies greater than 20 keV), the optical lens system having a small field-of-view, and trade-offs between smaller pixel size and detection efficiency (e.g., higher magnification objective lenses used with smaller pixel sizes, so thinner scintillators limit the detector efficiency). In addition, the first class of x-ray imaging detectors can have a limited ability to discriminate between x-ray energies and being unable to provide angular information of the detected x-rays.

A second class of x-ray imaging detectors (e.g., generally referred to as flat panel detectors) typically comprise an x-ray scintillator material (e.g., structured CsI scintillator) or an x-ray phosphor layer (e.g., Gadox phosphor) on top of a thin film transistor array or a CMOS detector. This second class of x-ray imaging detectors can exhibit a low spatial resolution (e.g., coarser than 50 microns) and a lack of energy resolution. A third class of x-ray imaging detectors (e.g., generally referred to as hybrid photon counting detectors or direct detectors) typically comprise a photoconductor that converts x-ray signals to electrical signals. This third class of x-ray imaging detectors can exhibit low spatial resolution (e.g., coarser than 25 microns), limited ability to discriminate between x-ray energies, and being unable to provide angular information of the detected x-rays. This third class of x-ray imaging detectors can also be expensive for large pixel arrays (e.g., having more than 2000×2000 pixels and for detectors capable of hard x-ray detection).

In addition, hybrid detectors (see, e.g., U.S. Pat. No. 7,286,640 B2) can comprise two scintillators that are upstream of a mirror that redirects the optical light to an optical lens system and then to a CCD detector. Such detectors can capture images at two different propagation distances for propagation phase contrast retrieval for biomedical applications and for enabling dual energy analysis, but they are unable to provide angular information of the detected x-rays.

SUMMARY

In certain implementations, an apparatus comprises at least one scintillator configured to allow first x-rays of an x-ray beam incident on the at least one scintillator to propagate through the at least one scintillator and to generate visible light in response to second x-rays of the x-ray beam. The apparatus further comprises at least one optical lens system configured to allow propagation of at least a first portion of the first x-rays through the at least one optical lens system and to relay at least some of the visible light to an image plane of the at least one optical lens system. The apparatus further comprises at least one mirror configured to allow propagation of at least a second portion of the first portion of the first x-rays through the at least one mirror and to reflect at least some of the visible light from the at least one optical lens system in a direction non-parallel relative to an x-ray propagation direction of the first x-rays propagating through the at least one optical lens system and the at least one mirror. The apparatus further comprises at least one optical detector system comprising a plurality of active elements at the image plane of the at least one optical lens system and configured to receive the visible light reflected by the at least one mirror.

In certain implementations, an apparatus comprises a plurality of x-ray imaging detectors comprising at least a first x-ray imaging detector and a second x-ray imaging detector. The first and second x-ray imaging detectors are configured sequentially along an x-ray beam propagation direction.

DETAILED DESCRIPTION

A high numerical aperture (NA) optical lens system (e.g., having a small depth-of-field) together with a thin scintillator with a thickness comparable to the depth-of-field is typically used to achieve high spatial resolution. However, the thin scintillator can only absorb a small fraction of the x-rays incident on the thin scintillator (e.g., the thin scintillator has a low x-ray stopping power), therefore detection efficiency can be low, especially for high energy x-rays (e.g., energies greater than 10 keV, greater than 20 keV, greater than 40 keV, or greater than 80 keV).

For higher efficiency detectors and/or higher NA optical systems with smaller working distances of the objective, the objective can be within the x-ray path (e.g., rather than the mirror). However, the objective within the x-ray path can attenuate x-rays and can distort the x-ray data collected. In certain implementations described herein, at least two detectors each comprise a scintillator and an objective coupled to (e.g., in optical communication with) one another for a relatively compact system. In certain implementations, the at least two detectors are used in combination with a flat panel detector.

Figure 1:
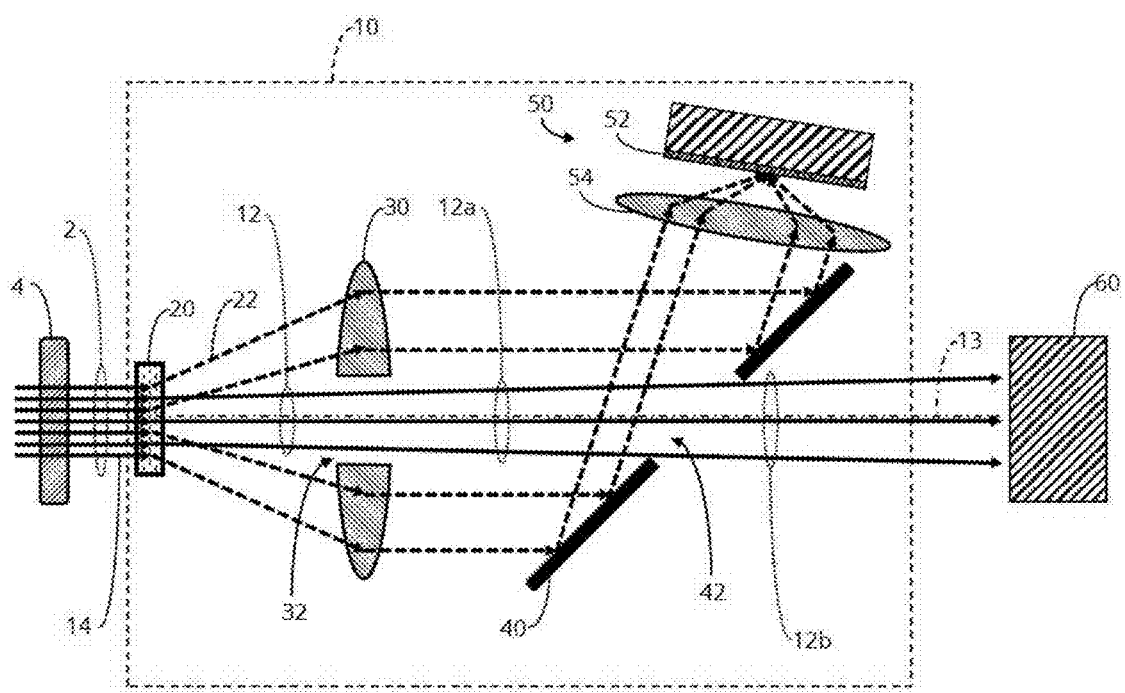
FIG. 1 schematically illustrates an example apparatus in accordance with certain implementations described herein.

FIG. 1 schematically illustrates an example implementation of an example apparatus 10 in accordance with certain implementations described herein. The apparatus 10 comprises at least one scintillator 20 configured to allow first x-rays 12 of an x-ray beam 2 incident on the at least one scintillator 20 to propagate through the at least one scintillator 20 and generate visible light 22 in response to second x-rays 14 of the x-ray beam 2. The apparatus 10 further comprises at least one optical lens system 30 configured to allow propagation of at least a first portion 12a of the first x-rays 12 through at least one optical lens system 30 and to relay at least some of the visible light 22 to an image plane of the at least one optical lens system 30. The apparatus 10 further comprises at least one mirror 40 configured to allow propagation of at least a second portion 12b of the first portion 12a of the first x-rays 12 through the at least one mirror 40 and to reflect at least some of the visible light 22 from the at least one optical lens system 30 in a direction non-parallel relative to an x-ray propagation direction 13 of the first x-rays 12 propagating through the at least one optical lens system 30 and the at least one mirror 40. The apparatus 10 further comprises at least one optical detector system 50 comprising a plurality of active elements 52 at the image plane of the at least one optical lens system 30 and configured to receive the visible light 22 reflected by the at least one mirror 40.

As shown in FIG. 1, the apparatus 10 of certain implementations can comprise a type-I x-ray imaging detector (e.g., a detector comprising an objective lens with an aperture configured to allow x-ray transmission through the objective lens and a mirror downstream from the objective lens configured to reflect light away from the x-ray beam), while in certain other implementations, the apparatus 10 can comprise a type-II x-ray imaging detector (e.g., a detector comprising a mirror configured to allow x-ray transmission through the mirror and to reflect light away from the x-ray beam and an objective lens downstream from the mirror). In certain implementations, the x-ray beam 2 comprises an x-ray image and the at least one scintillator 12 is configured to convert the second x-rays 14 of the x-ray beam 2 to an optical image. For example, the x-ray beam 2 can comprise x-rays that have propagated through an object 4 such that the x-ray image of the x-ray beam 2 comprises structural information regarding the object 4. In certain implementations, the x-ray beam 2 is collimated (e.g., having a divergence angle less than 1 degree or less than 0.1 degree), while in certain other implementations, the x-ray beam 2 is diverging (e.g., having a divergence angle greater than 1 degree, greater than 3 degrees, or greater than 10 degrees).

In certain implementations, the at least one scintillator 20 comprises at least one scintillator material. For example, the at least one scintillator material can comprise LSO (e.g., doped with Ce) which has sufficiently strong x-ray absorption efficiency for x-rays of energies above the K absorption edge of lutetium (e.g., around 62 keV). Other example scintillator materials compatible with certain implementations described herein include but are not limited to: $CaF_2$, $BaF_2$, YAP, GdAP, LuAG, YbSO, LySO, GGG, GaGG, $Lu_2O_3$, YAG, LuAP, CsI, GLO, and $CdWO_4$ with appropriate doping. In certain implementations, the at least one scintillator material can comprise an x-ray phosphor material (e.g., Gadox).

In certain implementations, the at least one scintillator material has a thickness along the x-ray propagation direction 13 in a range of 1 micron to 500 microns (e.g., in a range of 2 microns to 40 microns; in a range of 50 microns to 500 microns) and that is configured to emit visible (e.g., optical) light 22 that includes wavelengths in a range of 300 nm to 700 nm (e.g., approximately equal to 320 nm; approximately equal to 400 nm; less than 700 nm). In certain implementations, the thickness of the at least one scintillator material is configured to provide an optical image with sufficiently high spatial resolution (e.g., the thickness is approximately equal to or less than five times of the depth-of-field of the at least one optical lens system 30). In certain implementations, the at least one scintillator material extends in at least one direction in a plane substantially perpendicular to the x-ray propagation direction 13 over an area that is approximately equal to or larger than the field-of-view of the at least one optical lens system 30 (e.g., in an area that is a range of 1× to 10× of the field-of-view of the at least one optical lens system 30). In certain implementations, the at least one scintillator material has a light yield that is sufficiently high (e.g., in a range of greater than 10 photons per keV absorbed energy) such that the apparatus 10 can obtain sufficiently high detection efficiency (e.g., greater than 5%; greater than 25%). In certain implementations, the at least one scintillator material is configured to provide a predetermined spectral response (e.g., higher absorption efficiency for a predetermined spectral region for a predetermined thickness).

In certain implementations, the at least one scintillator material and the thickness of the at least one scintillator material are configured to provide a predetermined tradeoff between spatial resolution and x-ray absorption efficiency (e.g., thin scintillators can provide higher spatial resolution while thick scintillators can provide greater x-ray absorption efficiency). In certain implementations, the at least one scintillator 20 comprises at least one substrate and the at least one scintillator material is at least one layer on the at least one substrate. The at least one substrate can have a sufficiently small thickness (e.g., along the x-ray propagation direction 13), at least over an imaging area of the at least one scintillator 20, to reduce (e.g., minimize) image background contributions to the optical image of the visible light 22 due to secondary particles (e.g., x-ray fluorescence and electrons) from interactions of the x-ray beam 2 with the at least one substrate. In certain implementations, the at least one scintillator material and the thicknesses of the at least one substrate and the at least one scintillator material are configured such that the at least one scintillator 20 has an x-ray transmission in a range of 5%-90% for x-rays having predetermined energies or energy bandwidths (e.g., greater than 5 keV; greater than 20 keV). In certain implementations, the apparatus 10 comprises a plurality of scintillators 20 with different scintillator materials and/or thicknesses and an adjustable stage (e.g., having manual or motorized control) configured to change which scintillator 20 and scintillator material is in the x-ray propagation direction 13 (e.g., by swapping amongst two or more different scintillators with different scintillator materials and/or thicknesses). In certain implementations, the at least one scintillator 20 is substantially perpendicular to the x-ray propagation direction 13, while in certain other implementations, the at least one scintillator 20 is configured to be tilted to be non-normal to the x-ray propagation direction 13, such that the at least one scintillator 20 has an increased effective thickness along the x-ray propagation direction 13 and a concomitantly increased x-ray absorption efficiency. In certain such implementations, the at least one optical lens system 30 is also tilted correspondingly relative to the x-ray propagation direction 13, such that the depth-of-focus is not increased and the spatial resolution is not degraded (e.g., avoiding a trade-off between x-ray absorption efficiency and spatial resolution).

In certain implementations, the at least one optical lens system 30 is downstream from the at least one scintillator 20 and is configured to form an enlarged optical image from the visible light 22. For example, the at least one optical lens system 30 can have a predetermined numerical aperture (NA) sufficient to obtain a predetermined spatial resolution (e.g., in a range of 0.1 to 0.9; in a range of 0.2 to 0.6) of the visible light 22 emitted by the at least one scintillator 20. In certain implementations, the NA is selected based on at least one of: the maximum resolution to be achieved, the depth-of-field to be used, and/or considerations for efficient collection of the visible light 22 generated in the at least one scintillator 20 (e.g., when used for low energy x-ray imaging applications).

In certain implementations, the at least one optical lens system 30 comprises a microscope objective. For example, the microscope objective can comprise a reflective microscope objective that is achromatic over a sufficiently wide spectral range (e.g., wavelengths from 200 nm to 10 microns) and is compatible with predetermined scintillator materials configured to generate visible light 22 having predetermined wavelengths (e.g., the microscope objective is achromatic over a spectral range that includes the wavelengths of the visible light 22 emitted by the predetermined scintillator materials). Example microscope objectives compatible with certain implementations described herein include but are not limited to: microscope objectives with magnification in a range of 2× to 100× (e.g., in a range of 4× to 40×) and a field number greater than 18 mm (e.g., greater than 20 mm; greater than 24 mm). In certain implementations, the optical lens system 30 comprises a lens (e.g., camera lens). Example microscope objectives compatible with certain implementations described herein include but are not limited to: Nikor lens series available from Nikon Corp. with an f-number smaller than 2.8 (e.g., smaller than 2; smaller than 1.4).

In certain implementations, the at least one optical lens system 30 (e.g., type-I) comprises at least one x-ray transmissive region 32 (e.g., at least one aperture or hole; pupil) configured to allow propagation of the first portion 12a of the first x-rays 12 through the at least one optical lens system 30. As shown in FIG. 1, the at least one x-ray transmissive region 32 can be positioned in a central region of the at least one optical lens system 30. For example, the at least one x-ray transmissive region 32 can comprise a hole that is machined through the microscope objective and/or the lens having sufficient width (e.g., diameter) in at least one direction substantially perpendicular to the x-ray propagation direction 13 to allow the first portion 12a of the first x-rays 12 to propagate therethrough. The width (e.g., diameter) of the hole can correspond to less than one-half of the NA of the at least one optical lens system 30.

In certain implementations, the at least one mirror 40 is downstream from the at least one optical lens system 30 (e.g., between the at least one optical lens system 30 and the image plane of the at least one optical lens system 30) and is configured to reflect the visible light 22 received from the at least one optical lens system 30 (e.g., and the image plane of the at least one optical lens system 30) at a non-zero angle relative to the x-ray propagation direction 13 (e.g., to reflect the visible light 22 and the image plane out of the x-ray beam path of the first portion 12a of the x-ray beam 12).

In certain implementations, the at least one mirror 40 comprises a solid mirror comprising at least one solid material that is at least partially opaque to and at least partially reflective of the visible light 22 impinging the at least one mirror 40. For example, the at least one mirror 40 can comprise an aluminized microscope cover slip comprising glass or sapphire (e.g., having a thickness in a range of 100 micros to 200 microns).

In certain implementations, the at least one mirror 40 comprises at least one x-ray transmissive region 42 (e.g., at least one aperture, hole, or pupil; a solid portion sufficiently thin to allow at least 20% of the incident x-rays within a predetermined spectral region of the x-ray beam 2 to propagate therethrough) configured to allow propagation of the second portion 12b of the first portion 12a of the first x-rays 12 through the at least one mirror 40 (e.g., the at least one x-ray transmissive region 42 aligned with the first portion 12a of the x-ray beam 12 passing through the at least one optical lens system 30). The x-ray transmissive region 42 can have an x-ray transmission for a predetermined spectral region of the x-ray beam 2 that is greater than 20% (e.g., greater than 50%; greater than 90%). As shown in FIG. 1, the at least one x-ray transmissive region 42 can be positioned in a central region of the at least one mirror 40. For example, the at least one x-ray transmissive region 42 can comprise a hole that is machined a solid mirror 40 and has sufficient width (e.g., diameter) in at least one direction substantially perpendicular to the x-ray propagation direction 13 to allow the second portion 12b to propagate therethrough. For another example, the at least one mirror 40 can comprise a plurality of mirrors 40 arranged (e.g., substantially symmetrically) about (e.g., around) the x-ray propagation direction 13 with the at least one x-ray transmissive region 42 therebetween. For still another example, the at least one x-ray transmissive region 42 can comprise an x-ray transmissive material selected from the group consisting of: elements with atomic numbers smaller than 15 and can have a thickness in a range of less than 4 mm (e.g., less than 1 mm; less than 0.1 mm). The width (e.g., diameter) of the at least one x-ray transmissive region 42 can be approximately equal to or larger than the at least one x-ray transmissive region 32 of the at least one optical lens system 30.

In certain implementations, the at least one optical detector system 50 comprises an optical camera (e.g., CCD camera; CMOS camera) and the plurality of active elements 52 are at the reflected image plane of the at least one optical lens system 30. In certain implementations, as shown in FIG. 1, the at least one optical detector system 50 can further comprise at least one lens 54 (e.g., tube lens) configured to receive and focus the visible light 22 reflected from the at least one mirror 40 onto the plurality of active elements 52. The at least one optical detector system 50 can be configured to record the detected optical image from the visible light 22. In certain implementations, the at least one optical detector system 50 has a predetermined spectral response (e.g., optimized to the emission spectrum of the at least one scintillator 20).

In certain implementations, the apparatus 10 further comprises an x-ray detector system 60 (e.g., one or more type-I x-ray imaging detectors) configured to receive and use (e.g., for imaging) at least some of the x-rays of the second portion 12b that propagate through the at least one mirror 40. For example, as shown in FIG. 1, the x-ray detector system 60 can be positioned sequentially along the x-ray propagation direction 13 (e.g., downstream from the at least one mirror 40). Examples of the x-ray detector system 60 can include, but are not limited to: a scintillator and an optical lens that does not have a hole or aperture (e.g., the x-ray detector system 60 is not configured to transmit x-rays); an x-ray camera; a flat panel detector; a pixel array photon counting detector; an amorphous Se pixel array detector. For example, a flat panel detector of the x-ray detector system 60 can comprise single-crystal, high efficiency scintillator microstructures having a thickness (e.g., greater than or equal to 150 microns; in a range of 150 microns to 500 microns; greater than or equal to 500 microns), configured to reduce (e.g., minimize) scattering or other factors that can otherwise degrade spatial resolution.

Example Implementations

FIGS. 2A-2F schematically illustrate various example apparatus 100 in accordance with certain implementations described herein. Each of the example apparatus 100 of FIGS. 2A-2F comprises a plurality of x-ray imaging detectors 110 sequentially arranged along an x-ray propagation direction 13. For example, the plurality (e.g., array) of x-ray imaging detectors 110 can comprise at least a first x-ray imaging detector 110a and a second x-ray imaging detector 110b, the first and second x-ray imaging detectors 110a,b configured sequentially along the x-ray beam propagation direction 13 (e.g., the second x-ray imaging detector 110b downstream from the first x-ray imaging detector 110a).

In certain implementations, each x-ray imaging detector 110 of the plurality of x-ray imaging detectors 110 is configured to provide a spatial resolution finer than 25 microns (e.g., less than 10 microns; less than 2 microns; less than 1 micron). In certain implementations, the plurality of x-ray imaging detectors 110 comprises at least two (e.g., more than 2; more than 5, more than 10) x-ray imaging detectors 110 configured to achieve sufficiently high x-ray detection efficiency to facilitate x-ray imaging applications with x-rays having energies greater than 15 keV (e.g., greater than 30 keV; greater than 60 keV). Certain such implementations can facilitate optimizing resolution and detector efficiency and/or x-ray spectral response by selecting appropriate scintillator materials. In certain implementations, the first x-ray imaging detector 110a has a first field-of-view and the second x-ray imaging detector 110b has a second field-of-view, and a ratio of the first field-of-view to the second field-of-view is in a range of 1 to 50 and/or a ratio of the second field-of-view to the first field-of-view is in a range of 1 to 50.

Figure 2A:
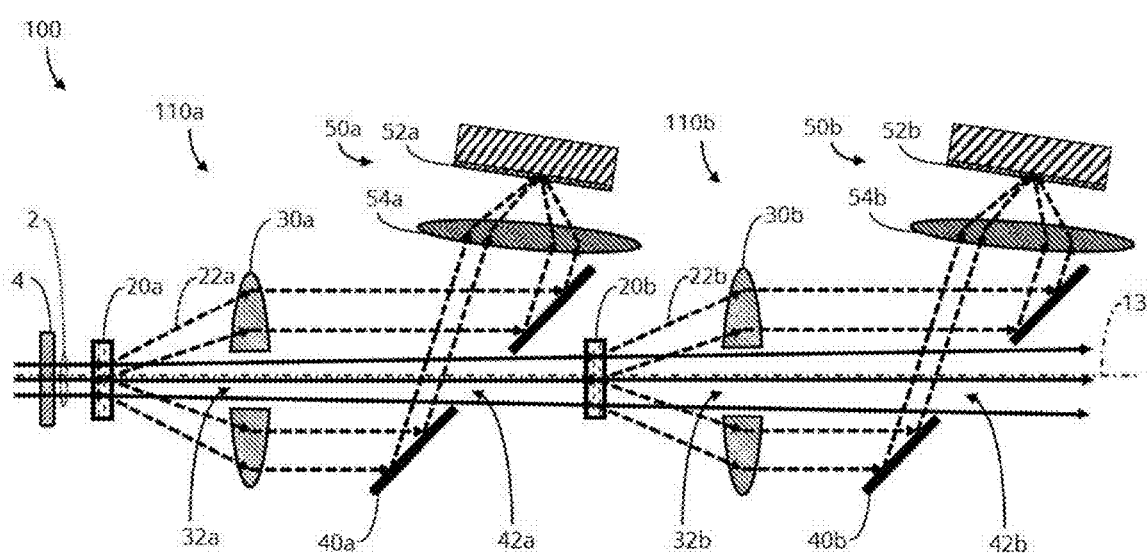
FIG. 2A schematically illustrates an example apparatus configured to receive an x-ray beam propagating along the x-ray propagation direction and comprising at least two type-I x-ray imaging detectors configured sequentially along the x-ray propagation direction in accordance with certain implementations described herein.

FIG. 2A schematically illustrates an example apparatus 100 configured to receive an x-ray beam 2 propagating along the x-ray propagation direction 13 and comprising at least two type-I x-ray imaging detectors configured sequentially along the x-ray propagation direction 13 in accordance with certain implementations described herein. As shown in FIG. 2A, the first x-ray imaging detector 110a (e.g., a type-I x-ray imaging detector) comprises a first scintillator 20a, a first optical lens system 30a (e.g., downstream from the first scintillator 20a), a first mirror 40a (e.g., downstream from the first optical lens system 30a), and a first optical detector system 50a. The first scintillator 20a is configured to be irradiated by an x-ray beam 2 propagating along an x-ray propagation direction 13, to generate first visible light 22a in response to at least some of the x-rays of the x-ray beam 2 (e.g., a first fraction of the x-rays incident on the first scintillator 20a), and to allow at least some x-rays of the x-ray beam 2 to propagate through the first scintillator 20a. The first optical lens system 30a is configured to receive at least some of the first visible light 22a from the first scintillator 20a and to allow at least some x-rays of the x-ray beam 2 that propagate through the first scintillator 20a to propagate through the first optical lens system 30a. For example, the first optical lens system 30a can comprise a first x-ray transmissive region 32a (e.g., a first aperture, hole, or pupil) having a width substantially perpendicular to the x-ray propagation direction 13 and in the range of 0.3 millimeter to 40 millimeters (e.g., in a range of 0.5 millimeter to 6 millimeters; in a range of 5 millimeters to 20 millimeters). The first mirror 40a is configured to reflect at least some of the first visible light 22a from the first optical lens system 30a in a first direction non-parallel relative to the x-ray propagation direction 13 and to allow at least some x-rays of the x-ray beam 2 that propagate through the first optical lens system 30a to propagate through the first mirror 40a. For example, the first mirror 40a can comprise a second x-ray transmissive region 42a (e.g., a second aperture, hole, or pupil; a solid portion sufficiently thin to allow at least 20% of the incident x-rays within a predetermined spectral region of the x-ray beam 2 to propagate therethrough) having a width substantially perpendicular to the x-ray propagation direction 13 and in the range of 0.3 millimeter to 40 millimeters (e.g., in a range of 0.5 millimeter to 6 millimeters; in a range of 5 millimeters to 20 millimeters). The first optical detector system 50a (e.g., comprising a first camera 52a and a first lens 54a configured to receive and focus the first visible light 22a from the first mirror 40a onto the first camera 52a) is configured to receive the first visible light 22a reflected by the first mirror 40a and to generate a first image in response to the received first visible light 22a.

As shown in FIG. 2A, the second x-ray imaging detector 110b (e.g., a type-I x-ray imaging detector) comprises a second scintillator 20b, a second optical lens system 30b (e.g., downstream from the second scintillator 20b), a second mirror 40b (e.g., downstream from the second optical lens system 30b), and a second optical detector system 50b. The second scintillator 20b is configured to be irradiated by the x-rays of the x-ray beam 2 that propagate through the first mirror 40a, to generate second visible light 22b in response to at least some of the x-rays of the x-ray beam 2 (e.g., a second fraction of the x-rays incident on the second scintillator 20b), and to allow at least some x-rays of the x-ray beam 2 to propagate through the second scintillator 20b. The second optical lens system 30b is configured to receive at least some of the second visible light 22b from the second scintillator 20b and to allow at least some x-rays of the x-ray beam 2 that propagate through the second scintillator 20b to propagate through the second optical lens system 30b. For example, the second optical lens system 30b can comprise a third x-ray transmissive region 32b (e.g., a third aperture, hole, or pupil) having a width substantially perpendicular to the x-ray propagation direction 13 and in the range of 0.3 millimeter to 40 millimeters (e.g., in a range of 0.5 millimeter to 6 millimeters; in a range of 5 millimeters to 20 millimeters). The second mirror 40*b* is configured to reflect at least some of the second visible light 22*b* from the second optical lens system 30*b* in a second direction non-parallel relative to the x-ray propagation direction 13 and to allow at least some x-rays of the x-ray beam 2 that propagate through the second optical lens system 30*b* to propagate through the second mirror 40*b*. For example, the second mirror 40*b* can comprise a fourth x-ray transmissive region 42*b* (e.g., a fourth aperture, hole, or pupil; a solid portion sufficiently thin to allow at least 20% of the incident x-rays within a predetermined spectral region of the x-ray beam 2 to propagate through) having a width substantially perpendicular to the x-ray propagation direction 13 and in the range of 0.3 millimeter to 40 millimeters (e.g., in a range of 0.5 millimeter to 6 millimeters; in a range of 5 millimeters to 20 millimeters). The second optical detector system 50*b* (e.g., comprising a second camera 52*b* and a second lens 54*b* configured to receive and focus the second visible light 22*b* from the second mirror 40*b* onto the second camera 52*b*) is configured to receive the second visible light 22*b* reflected by the second mirror 40*b* and to generate a second image in response to the received second visible light 22*b*.

While FIG. 2A shows that each of the first scintillator 20*a* and the second scintillator 20*b* is substantially perpendicular to the x-ray propagation direction 13, in certain other implementations, at least one of the first and second scintillators 20*a,b* is configured to be tilted to be non-normal to the x-ray propagation direction 13 (e.g., with the respective first and/or second optical lens system 30*a,b* also tilted correspondingly relative to the x-ray propagation direction 13). In certain implementations, the first scintillator 20*a* and the second scintillator 20*b* comprise different scintillating materials from one another (e.g., visible light 22*a*,6 emitted from the first and second scintillators 20*a,b*, respectively, have different spectral ranges from one another). In certain implementations, as shown in FIG. 2A, the first mirror 40*a* and the second mirror 40*b* reflect the first visible light 22*a* and the second visible light 22*b*, respectively, in first and second directions, respectively, that are substantially parallel to one another (e.g., the reflected first visible light 22*a* and the reflected second visible light 22*b* are at substantially equal non-zero angles relative to the x-ray propagation direction 13) and the first optical detector system 50*a* and the second optical detector system 50*b* are positioned at the same side of the x-ray propagation direction 13 (e.g., at substantially the same azimuthal angle about the x-ray propagation direction 13). In certain other implementations, the first mirror 40*a* and the second mirror 40*b* reflect the first visible light 22*a* and the second visible light 22*b*, respectively, in first and second directions, respectively, that are different from one another (e.g., that are not substantially parallel to one another; the reflected first visible light 22*a* and the reflected second visible light 22*b* are at substantially different non-zero angles relative to the x-ray propagation direction 13) and/or the first optical detector system 50*a* and the second optical detector system 50*b* are positioned at different azimuthal angles about (e.g., different sides of) the x-ray propagation direction 13.

Figure 2B:
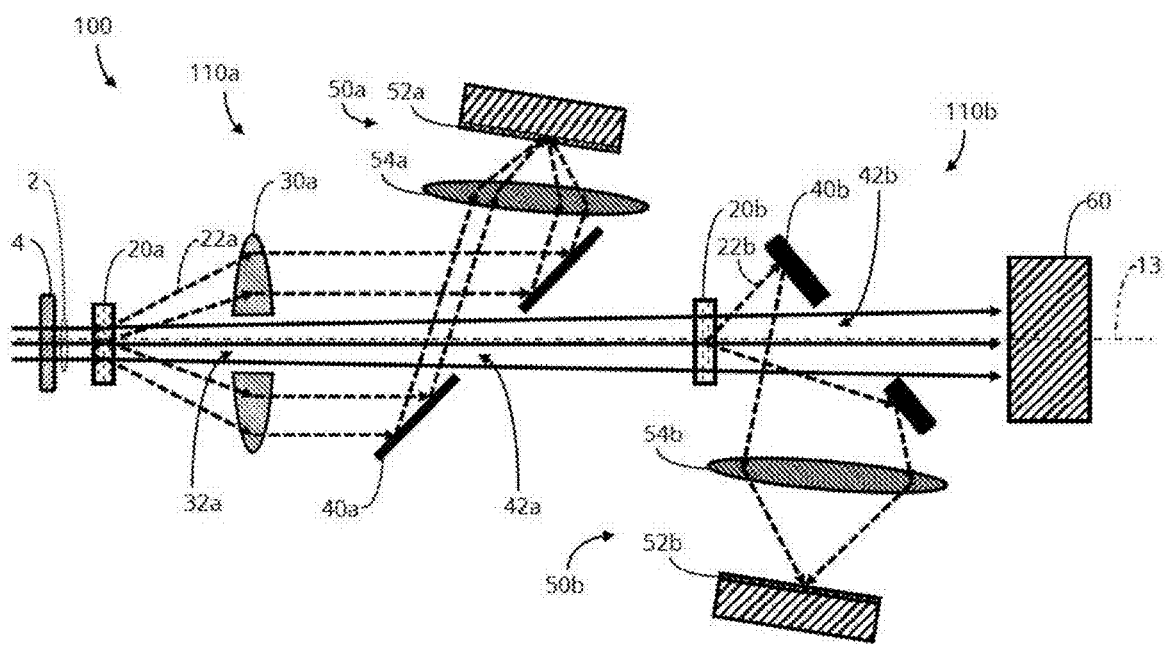
FIGS. 2B-2D schematically illustrates various example apparatus configured to receive an x-ray beam propagating along the x-ray propagation direction and comprising at least one type-I x-ray imaging detector and at least one type-II x-ray imaging detector configured sequentially along the x-ray propagation direction in accordance with certain implementations described herein.
Figure 2C:
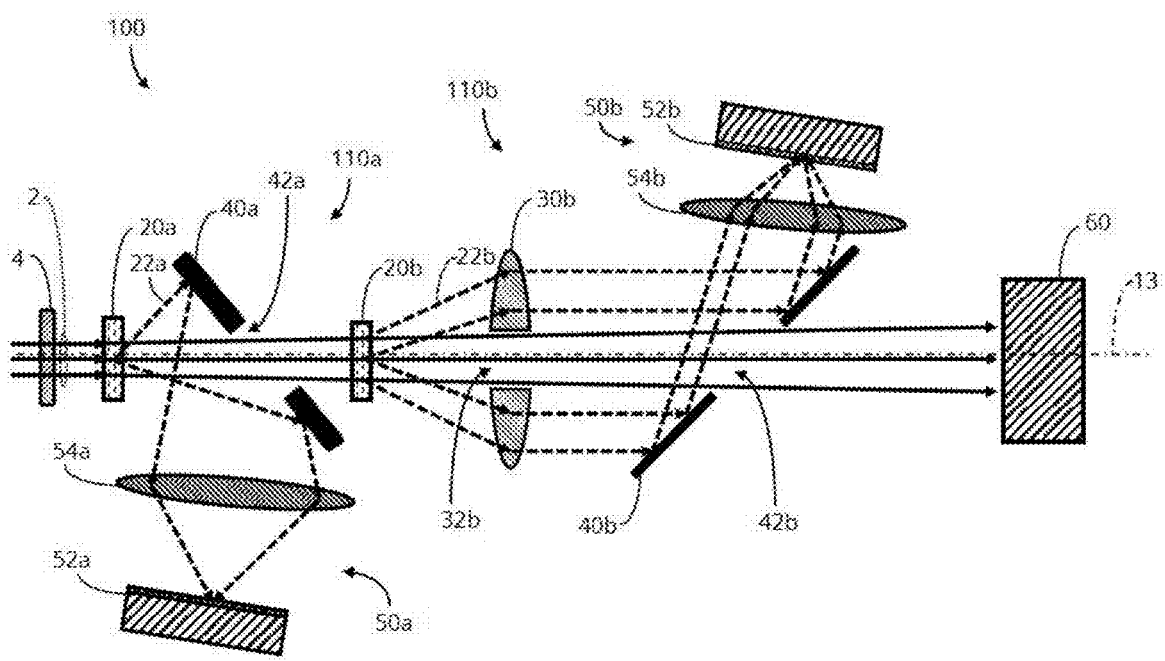
Figure 2D:
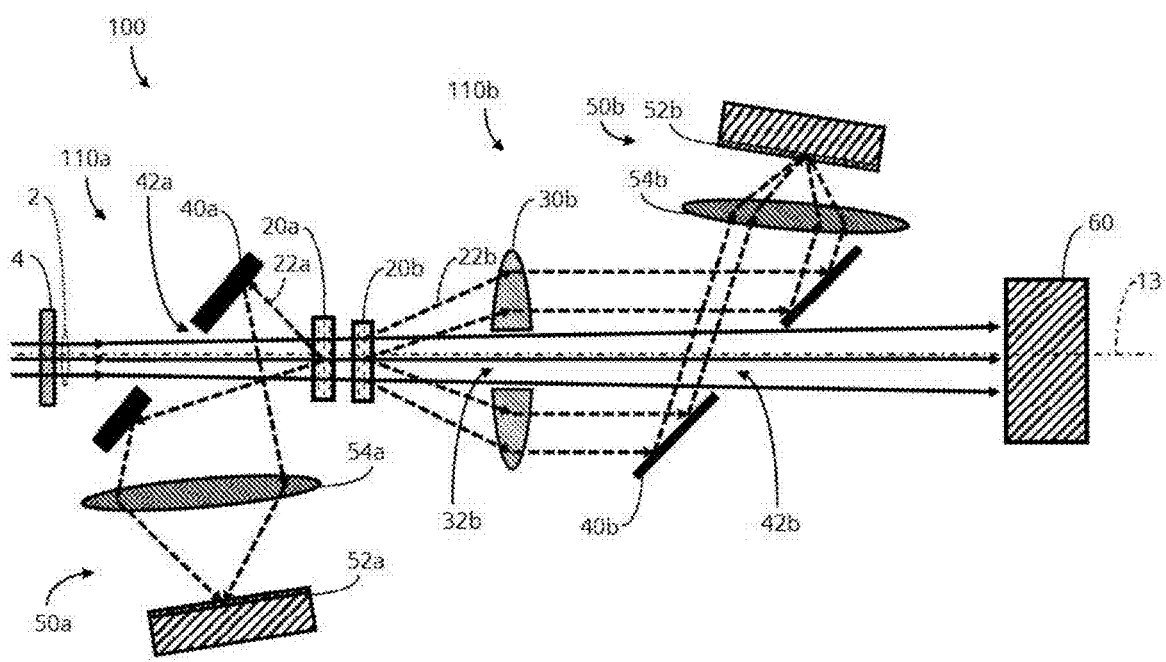

Each of FIGS. 2B-2D schematically illustrates an example apparatus 100 configured to receive an x-ray beam 2 propagating along the x-ray propagation direction 13 and comprising at least one type-I x-ray imaging detector and at least one type-II x-ray imaging detector configured sequentially along the x-ray propagation direction 13 in accordance with certain implementations described herein. As shown in FIGS. 2B-2D, in certain implementations, the at least one type-II x-ray imaging detector is downstream from the at least one type-I x-ray imaging detector, while in certain other implementations, the at least one type-I x-ray imaging detector is downstream from the at least one type-II x-ray imaging detector. Although each of the example apparatus 100 shown in FIGS. 2A-2D comprises only two x-ray imaging detectors 100*a,b*, other implementations can comprise more than two x-ray imaging detectors (e.g., comprising at least two type-I x-ray imaging detectors and at least one type-II x-ray imaging detector or comprising at least one type-I x-ray imaging detector and at least two type-II x-ray imaging detectors) configured sequentially along the x-ray beam propagation direction 13.

As shown in FIG. 2B, the first x-ray imaging detector 110*a* (e.g., a type-I x-ray imaging detector) can comprise a first scintillator 20*a*, a first optical lens system 30*a* (e.g., downstream from the first scintillator 20*a*), a first mirror 40*a* (e.g., downstream from the first optical lens system 30*a*), and a first optical detector system 50*a*. The first scintillator 20*a* can be configured to be irradiated by an x-ray beam 2 propagating along an x-ray propagation direction 13, to generate first visible light 22*a* in response to at least some of the x-rays of the x-ray beam 2 (e.g., a first fraction of the x-rays incident on the first scintillator 20*a*), and to allow at least some x-rays of the x-ray beam 2 to propagate through the first scintillator 20*a*. The first optical lens system 30*a* can be configured to receive at least some of the first visible light 22*a* from the first scintillator 20*a* and to allow at least some x-rays of the x-ray beam 2 that propagate through the first scintillator 20*a* to propagate through the first optical lens system 30*a*. For example, the first optical lens system 30*a* can comprise a first x-ray transmissive region 32*a* (e.g., a first aperture, hole, or pupil) having a width substantially perpendicular to the x-ray propagation direction 13 and in the range of 0.3 millimeter to 40 millimeters (e.g., in a range of 0.5 millimeter to 6 millimeters; in a range of 5 millimeters to 20 millimeters). The first mirror 40*a* can be configured to reflect at least some of the first visible light 22*a* from the first optical lens system 30*a* in a first direction non-parallel relative to the x-ray propagation direction 13 and to allow at least some x-rays of the x-ray beam 2 that propagate through the first optical lens system 30*a* to propagate through the first mirror 40*a*. For example, the first mirror 40*a* can comprise a second x-ray transmissive region 42*a* (e.g., a second aperture, hole, or pupil; a solid portion sufficiently thin to allow at least 20% of the incident x-rays within for a predetermined spectral region of the x-ray beam 2 to propagate therethrough) having a width substantially perpendicular to the x-ray propagation direction 13 and in the range of 0.3 millimeter to 40 millimeters (e.g., in a range of 0.5 millimeter to 6 millimeters; in a range of 5 millimeters to 20 millimeters). The first optical detector system 50*a* (e.g., comprising a first camera 52*a* and a first lens 54*a* configured to receive and focus the first visible light 22*a* from the first mirror 40*a* onto the first camera 52*a*) can be configured to receive the first visible light 22*a* reflected by the first mirror 40*a* and to generate a first image in response to the received first visible light 22*a*.

As shown in FIG. 2B, the second x-ray imaging detector 110*b* (e.g., a type-II x-ray imaging detector) can comprise a second scintillator 20*b*, a second mirror 40*b* (e.g., downstream from the second scintillator 20*b*), and a second optical detector system 50*b*. The second scintillator 20*b* can be configured to be irradiated by the x-rays of the x-ray beam 2 that propagate through the first mirror 40*a*, to generate second visible light 22*b* in response to at least some of the x-rays of the x-ray beam 2 (e.g., a second fraction of the x-rays incident on the second scintillator 20b), and to allow at least some x-rays of the x-ray beam 2 to propagate through the second scintillator 20b. The second mirror 40b can be configured to reflect at least some of the second visible light 22b from the second scintillator 20b in a second direction non-parallel relative to the x-ray propagation direction 13 and to allow at least some x-rays of the x-ray beam 2 that propagate through the second scintillator 20b to propagate through the second mirror 40b. For example, the second mirror 40b can comprise a third x-ray transmissive region 42b (e.g., a third aperture, hole, or pupil; a solid portion sufficiently thin to allow at least 20% of the incident x-rays within a predetermined spectral region of the x-ray beam 2 to propagate therethrough) having a width substantially perpendicular to the x-ray propagation direction 13 and in the range of 0.3 millimeter to 40 millimeters (e.g., in a range of 0.5 millimeter to 6 millimeters; in a range of 5 millimeters to 20 millimeters). The second optical detector system 50b (e.g., comprising a second camera 52b and a second lens 54b configured to receive and focus the second visible light 22b from the second mirror 40b onto the second camera 52b) can be configured to receive the second visible light 22b reflected by the second mirror 40b and to generate a second image in response to the received second visible light 22b. While FIG. 2A shows that each of the first scintillator 20a and the second scintillator 20b is substantially perpendicular to the x-ray propagation direction 13, in certain other implementations, at least one of the first and second scintillators 20a,b is configured to be tilted to be non-normal to the x-ray propagation direction 13.

As shown in FIGS. 2C and 2D, the first x-ray imaging detector 110a (e.g., a type-II x-ray imaging detector) can comprise a first scintillator 20a, a first mirror 40a, and a first optical detector system 50a. The first scintillator 20a can be configured to be irradiated by the x-rays of the x-ray beam 2, to generate first visible light 22a in response to at least some of the x-rays of the x-ray beam 2 (e.g., a first fraction of the x-rays incident on the first scintillator 20a), and to allow at least some x-rays of the x-ray beam 2 to propagate through the first scintillator 20a. The first mirror 40a can be configured to reflect at least some of the first visible light 22a from the first scintillator 20a in a first direction non-parallel relative to the x-ray propagation direction 13 and to allow at least some x-rays of the x-ray beam 2 that propagate through the first scintillator 20a to propagate through the first mirror 40a. For example, the first mirror 40a can comprise a first x-ray transmissive region 42a (e.g., an aperture, hole, or pupil; a solid portion sufficiently thin to allow at least 20% of the incident x-rays within a predetermined spectral region of the x-ray beam 2 to propagate therethrough) having a width substantially perpendicular to the x-ray propagation direction 13 and in the range of 0.3 millimeter to 40 millimeters (e.g., in a range of 0.5 millimeter to 6 millimeters; in a range of 5 millimeters to 20 millimeters). The first optical detector system 50a (e.g., comprising a first camera 52a and a first lens 54a configured to receive and focus the first visible light 22a from the first mirror 40a onto the first camera 52a) can be configured to receive the first visible light 22a reflected by the first mirror 40a and to generate a first image in response to the received first visible light 22a.

As shown in FIGS. 2C and 2D, the second x-ray imaging detector 110b (e.g., a type-I x-ray imaging detector) can comprise a second scintillator 20b, an optical lens system 30b (e.g., downstream from the first scintillator 20b), a second mirror 40b (e.g., downstream from the optical lens system 30b), and a second optical detector system 50b. The second scintillator 20b can be configured to be irradiated by the portion of the x-ray beam 2 propagating along the x-ray propagation direction 13 through the first x-ray transmissive region 42a, to generate second visible light 22b in response to at least some of the x-rays of the x-ray beam 2 (e.g., a second fraction of the x-rays incident on the second scintillator 20b), and to allow at least some x-rays of the x-ray beam 2 to propagate through the second scintillator 20b. The optical lens system 30b can be configured to receive at least some of the second visible light 22b from the second scintillator 20b and to allow at least some x-rays of the x-ray beam 2 that propagate through the second scintillator 20b to propagate through the optical lens system 30b. For example, the optical lens system 30b can comprise a second x-ray transmissive region 32b (e.g., a second aperture, hole, or pupil) having a width substantially perpendicular to the x-ray propagation direction 13 and in the range of 0.3 millimeter to 40 millimeters (e.g., in a range of 0.5 millimeter to 6 millimeters; in a range of 5 millimeters to 20 millimeters). The second mirror 40b can be configured to reflect at least some of the second visible light 22b from the optical lens system 30b in a second direction non-parallel relative to the x-ray propagation direction 13 and to allow at least some x-rays of the x-ray beam 2 that propagate through the optical lens system 30b to propagate through the second mirror 40b. For example, the second mirror 40b can comprise a third x-ray transmissive region 42b (e.g., a third aperture, hole, or pupil; a solid portion sufficiently thin to allow at least 20% of the incident x-rays within a predetermined spectral region of the x-ray beam 2 to propagate therethrough) having a width substantially perpendicular to the x-ray propagation direction 13 and in the range of 0.3 millimeter to 40 millimeters (e.g., in a range of 0.5 millimeter to 6 millimeters; in a range of 5 millimeters to 20 millimeters). The second optical detector system 50b (e.g., comprising a second camera 52b and a second lens 54b configured to receive and focus the second visible light 22b from the second mirror 40b onto the second camera 52b) can be configured to receive the second visible light 22b reflected by the second mirror 40b and to generate a second image in response to the received second visible light 22b. While FIG. 2A shows that each of the first scintillator 20a and the second scintillator 20b is substantially perpendicular to the x-ray propagation direction 13, in certain other implementations, at least one of the first and second scintillators 20a,b is configured to be tilted to be non-normal to the x-ray propagation direction 13.

As shown in FIG. 2C, the first mirror 40a is downstream from the first scintillator 20a, while in certain other implementations, as shown in FIG. 2D, the first mirror 40a is upstream from the first scintillator 20a and the first scintillator 20a is irradiated by at least some of the x-rays of the x-ray beam 2 that propagate through the first x-ray transmissive region 42a of the first mirror 40a. In certain implementations, as shown in FIG. 2D, the first scintillator 20a and the second scintillator 20b can be adjacent to one another. The apparatus 100 can comprise a light blocker (not shown) between the first and second scintillators 20a,b that is optically opaque but is transmissive to the x-rays of the x-ray beam 2 (e.g., x-ray transmission greater than 20% for x-rays having energies greater than 5 keV). For example, the light blocker can comprise a thin graphite plate or a plastic film coated with a carbon layer or a thin Al layer.

Figure 2E:
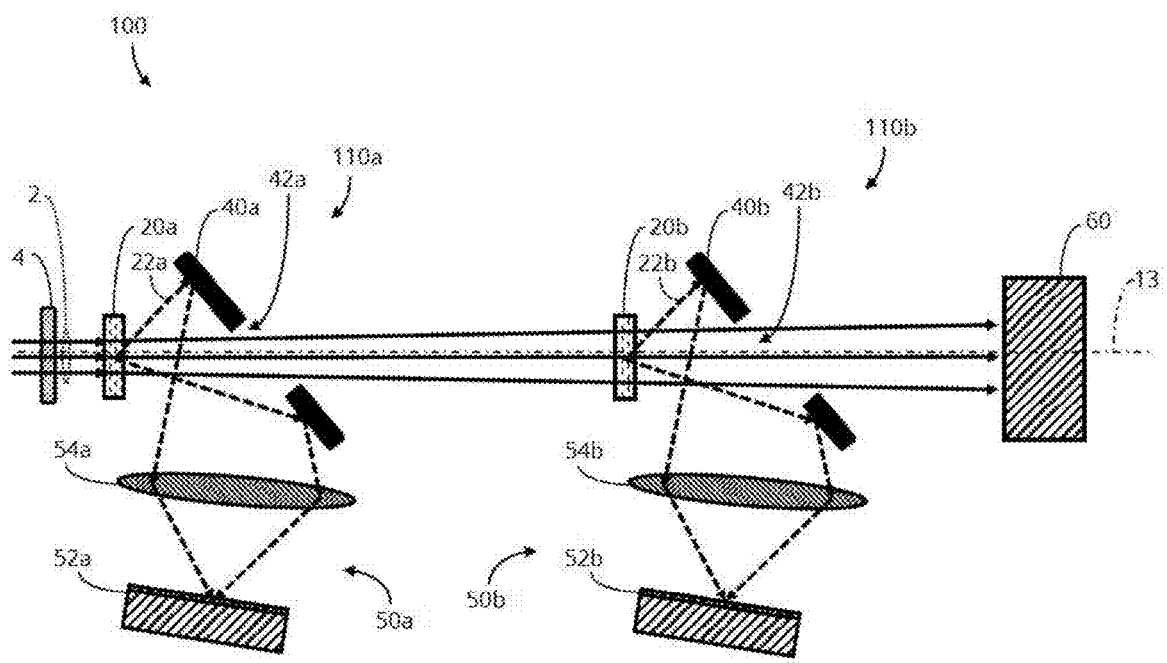
FIG. 2E schematically illustrates an example apparatus configured to receive an x-ray beam propagating along the x-ray propagation direction and comprising at least two type-II x-ray imaging detectors configured sequentially along the x-ray propagation direction in accordance with certain implementations described herein.

FIG. 2E schematically illustrates an example apparatus 100 configured to receive an x-ray beam 2 propagating along the x-ray propagation direction 13 and comprising at least two type-II x-ray imaging detectors configured sequentially along the x-ray propagation direction 13 in accordance with certain implementations described herein. As shown in FIG. 2E, the first x-ray imaging detector 110a (e.g., a type-II x-ray imaging detector) can comprise a first scintillator 20a, a first mirror 40a, and a first optical detector system 50a, as described herein with regard to FIGS. 2C and 2D, and the second x-ray imaging detector 110b (e.g., a type-II x-ray imaging detector) can comprise a second scintillator 20b, a second mirror 40b (e.g., downstream from the second scintillator 20b), and a second optical detector system 50b, as described herein with regard to FIG. 2B. While FIG. 2E shows the first mirror 40a is downstream from the first scintillator 20a and the second mirror 40b is downstream from the second scintillator 20b, in certain other implementations, the first mirror 40a is upstream from the first scintillator 20a (see, e.g., FIG. 2D) and/or the second mirror 40b is upstream from the second scintillator 20b.

As shown in FIGS. 2B-2E, in certain implementations, the apparatus 100 further comprises an x-ray detector system 60 (e.g., one or more type-I x-ray imaging detectors; one or more type-II x-ray imaging detectors) configured to receive and use (e.g., for imaging) at least some of the x-rays of the x-ray beam 2 that propagate through both the first x-ray imaging detector 110a and the second x-ray imaging detector 110b. For example, as shown in FIGS. 2B-2E, the x-ray detector system 60 can be positioned sequentially along the x-ray propagation direction 13 (e.g., downstream from the first and second x-ray imaging detectors 110a,b). Examples of the x-ray detector system 60 can include, but are not limited to: a scintillator and an optical lens that does not have a hole or aperture (e.g., the x-ray detector system 60 is not configured to transmit x-rays); an x-ray camera; a flat panel detector; a pixel array photon counting detector; an amorphous Se pixel array detector. For example, a flat panel detector of the x-ray detector system 60 can comprise single-crystal, high efficiency scintillator microstructures having a thickness (e.g., greater than or equal to 250 microns; in a range of 150 microns to 250 microns; greater than or equal to 500 microns), configured to reduce (e.g., minimize) scattering or other factors that can otherwise degrade spatial resolution. While FIG. 2E shows that each of the first scintillator 20a and the second scintillator 20b is substantially perpendicular to the x-ray propagation direction 13, in certain other implementations, at least one of the first and second scintillators 20a,b is configured to be tilted to be non-normal to the x-ray propagation direction.

Figure 2F:
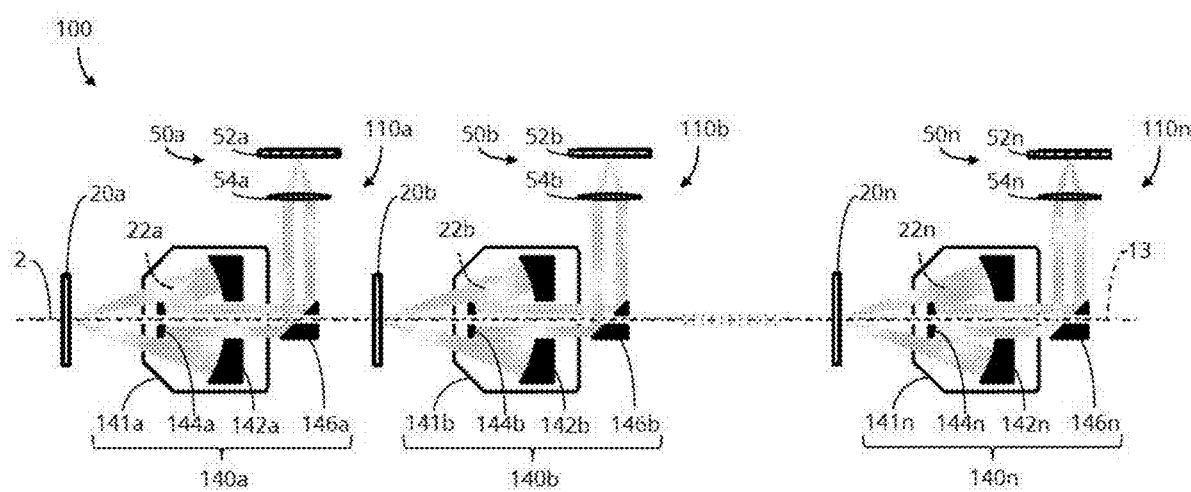
FIG. 2F schematically illustrates an example apparatus comprising a plurality of x-ray imaging detectors configured sequentially along an x-ray beam propagation direction in accordance with certain implementations described herein.

FIG. 2F schematically illustrates an example apparatus 100 comprising a plurality of x-ray imaging detectors 110a, b, . . . , n configured sequentially along an x-ray beam propagation direction 13 in accordance with certain implementations described herein. As shown in FIG. 2F, each x-ray imaging detector 110a,b, . . . , n comprises at least one scintillator 20a,b, . . . , n configured to allow a portion of the x-ray beam 2 incident on the at least one scintillator 20a,b, . . . , n to propagate through the at least one scintillator 20a,b, . . . , n and to generate visible light 22a,b, . . . , n in response to at least some of the x-rays of the x-ray beam 2. Each x-ray imaging detector 110a,b, . . . , n further comprises an objective 140a,b, . . . , n comprising at least one mirror 40a,b, . . . , n configured to allow propagation of at least a portion of the x-ray beam 2 through the objective 140a,b, . . . n and to reflect at least some of the visible light 22a,b, . . . , n from the at least one scintillator 20a,b, . . . , n in a direction non-parallel (e.g., substantially perpendicular) relative to the x-ray propagation direction 13 of the x-ray beam 2. Each x-ray imaging detector 110a,b, . . . , n further comprises at least one optical detector system 50a,b, . . . , n (e.g., each comprising a camera 52a,b, . . . , n and a lens 54a,b, . . . , n) configured to receive the visible light 22a,b, . . . , n reflected by the objective 140a,b, . . . , n and to generate an image in response to the received visible light 22a,b, . . . , n. While FIG. 2F shows that each of the at least one scintillator 20a,b, . . . , n is substantially perpendicular to the x-ray propagation direction 13, in certain other implementations, at least one of scintillators 20a,b, . . . , n is configured to be tilted to be non-normal to the x-ray propagation direction 13 (e.g., with the respective optical detector system 50a,b, . . . , n also tilted correspondingly relative to the x-ray propagation direction 13).

In certain implementations, as shown in FIG. 2F, each x-ray imaging detector 110a,b, . . . , n can comprise an objective enclosure 141a,b, . . . , n containing at least a portion of the at least one mirror 40a,b, . . . , n. The at least one mirror 40a,b, . . . , n can comprise a first mirror 142a,b, . . . , n (e.g., convex mirror), a second mirror 144a,b, . . . , n (e.g., concave mirror), and a third mirror 146a,b, . . . , n (e.g., substantially flat mirror). For example, both the first mirror 142a,b, . . . n and the second mirror 144a,b, . . . , n can be within the objective enclosure 140a,b, . . . , n (e.g., with the first mirror 142a,b, . . . , n downstream from the second mirror 144a,b, . . . , n) and the third mirror 146a,b, . . . , n can be outside the objective enclosure 140a,b, . . . , n (e.g., downstream from the first mirror 142a,b, . . . , n). Each of the first mirror 142a,b, . . . , n, the second mirror 144a,b, . . . , n, and the third mirror 146a,b, . . . , n can comprise an x-ray transmissive region 42a,b, . . . , n configured to allow at least a portion of the x-ray beam 2 to propagate therethrough.

The first mirror 142a,b, . . . , n can be configured to receive and reflect the visible light 22a,b, . . . , n from the at least one scintillator 20a,b, . . . , n to the second mirror 144a,b, . . . , n. The second mirror 144a,b, . . . , n can be configured to receive and reflect the visible light 22a,b, . . . , n from the first mirror 142a,b, . . . , n to the third mirror 146a,b, . . . , n. For example, the first mirror 142a,b, . . . , n can comprise an aperture configured to allow the visible light 22a,b, . . . , n to propagate through the first mirror 142a,b, . . . , n from the second mirror 144a,b, . . . , n to the third mirror 146a,b, . . . , n. The third mirror 146a,b, . . . , n can be configured to receive and reflect the visible light 22a,b, . . . , n (e.g., by an angle substantially equal to 45 degrees) to the optical detector system 50a,b, . . . , n.

While FIG. 2F shows each of the x-ray imaging detectors 110a,b, . . . n as having substantially identical structures to one another (e.g., each comprises a type-II x-ray imaging detector), in certain other implementations, two or more of the x-ray imaging detectors 110a,b, . . . n have different structures from one another (e.g., at least one type-I x-ray imaging detector and at least one type-II x-ray imaging detector).

In certain implementations, the scintillator materials of the at least one scintillator 20a,b, . . . , n are configured to have sufficiently high x-ray absorption of the x-rays of the x-ray beam 2 in a predetermined energy band, based on the absorption edges of a high atomic number (Z) elements of the scintillator materials. For example, ten x-ray imaging detectors 110, each with a 5-micron LSO scintillator 20 and a reflective microscope objective 140 with 0.5 NA, can be used for sub-micron resolution imaging with an effective total 50-micron LSO scintillator thickness with ten type-I and/or type-II x-ray imaging detectors. In certain implementations, the sequentially arranged plurality of x-ray imaging detectors 110 can offer up to 10× imaging speed/throughput as compared to a single x-ray imaging detector with the same scintillator 20 and the same optical lens system 30. In certain implementations, the LSO scintillator can be replaced by other scintillator materials or other thickness, or a different optical lens system can be used. For example, five x-ray imaging detectors 110 each with a 150-micron LSO scintillator and a 0.14 NA objective can be used for 6-micron resolution imaging with an effective 750-micron LSO scintillator thickness, which can offer up to 5× imaging speed/throughput compared to a single x-ray imaging detector with the same scintillator 20 and the optical lens system 30.

In certain implementations, the sequentially arranged plurality of x-ray imaging detectors 110 are configured to obtain a spatial resolution less than 10 microns (e.g., less than 3 microns; less than 1 micron) by utilizing scintillator materials emitting short wavelength light (e.g., less than 400 nm wavelength) and/or utilizing high NA lens systems (e.g., NA greater than 0.1, greater than 0.5, or greater than 0.7), and/or utilizing thin scintillators (e.g., thicknesses along the x-ray propagation direction 13 that are less than 5 microns). In certain implementations, the sequentially arranged plurality of x-ray imaging detectors 110 are configured to obtain a spatial resolution less than 10 microns (e.g., less than 3 microns; less than 1 micron) and another x-ray detector system 60 (e.g., a flat panel detector; pixel array photon counting detector; a pixel array amorphous Se detector) is positioned sequentially along the x-ray propagation direction 13 (e.g., downstream from the plurality of x-ray imaging detectors 110) and is configured for high x-ray detection efficiency with coarser spatial resolution (e.g., greater than 10 microns; greater than 25 microns; greater than 50 microns).

In certain implementations, the sequentially arranged plurality of x-ray imaging detectors 110 comprise different scintillation materials and thicknesses to obtain predetermined detection efficiency for x-rays within predetermined energy bandwidths. For example, LSO scintillators absorb more strongly for x-rays of energies greater than 63.3 keV (which corresponds to the K absorption edge of lutetium) than do CsI scintillators of the same thickness. In certain implementations, the LSO scintillator can be replaced by other scintillator materials or other thickness to obtain high x-ray detection efficiency for x-rays of another predetermined energy range (e.g., GaGG for x-rays of energies in a range of 50.3 keV to 63 keV; YAG for x-rays of energies in a range of 17 keV to 35 keV; GLO for x-rays of energies in a range of 50.3 keV to 100 keV). In certain implementations, at least two scintillators 20 of different materials (e.g., YAG; CsI; GaGG; LSO; GLO) are used for their different spectral absorption efficiency responses as the x-ray absorption efficiency of a scintillator depends on the scintillator material (e.g., x-rays of energies higher than an absorption edge of a key atomic element in the scintillator are more strongly absorbed than x-rays of energies below the absorption edge). For example, three x-ray imaging detectors 110, each having a scintillator 20 with a scintillator material of CsI, GaGG, and LSO, respectively, can provide improved x-ray absorption for x-rays of energies across the range of 10 keV to 160 keV, as compared to all three x-ray imaging detectors 110 using the same scintillator material. In certain implementations, a plurality of x-ray imaging detectors 110 with two or more different scintillator materials are used with another x-ray detector system 60 (e.g., a flat panel detector; pixel array photon counting detector; a pixel array amorphous Se detector) and the recorded images can be processed to obtain spatially resolved spectral absorption information of an object being imaged. In certain implementations, at least one spectral filter comprising a high atomic number element and a predetermined thickness is positioned upstream of an x-ray imaging detector 110 to change the spectral response of the x-ray imaging detector 110. In certain implementations, another x-ray detector system 60 (e.g., a flat panel detector; pixel array photon counting detector; a pixel array amorphous Se detector) is used together with the plurality of x-ray imaging detectors 110 to obtain additional detection efficiency over a predetermined energy bandwidths (e.g., use of energy thresholds in a pixel array photon counting detector).

In certain implementations, the plurality of x-ray imaging detectors 110, with or without another x-ray detector system 60 (e.g., a flat panel detector; pixel array photon counting detector; a pixel array amorphous Se detector) is configured with predetermined separation distances between adjacent x-ray imaging detectors 110 along the x-ray beam propagation direction 13 to obtain angular divergence information of the x-ray beam 2, effectively acting as a 3D x-ray detector that records both positional information as well as angular information.

Various applications are compatible with certain such implementations. For example, such arrangement can be used for x-ray imaging of an object with absorption, and/or scattering (e.g., darkfield), and/or refraction contrast. For another example, certain implementations can be used to record the origin of x-rays diffracted by crystallites in an object illuminated by a focused x-ray beam 2, either a point focus x-ray beam 2 or a sheet focus x-ray beam 2. Using a 3D x-ray detector, a diffracted x-ray beam (e.g., having a narrow energy band) can be triangulated together with the focused x-ray beam 2 to localize the origin of a diffracted x-ray beam. Multiple diffracted beams can be recorded. For example, the scintillator material and the thickness of the scintillator 20 of the upstream x-ray imaging detector 110 can be configured such that the scintillator 20 has an x-ray transmission greater than 5% for the diffracted x-rays so that the transmitted diffracted x-rays can be recorded by a downstream detector. In certain implementations, the separation distance and the spatial resolution of the x-ray imaging detectors 110 can determine the precision for localizing the origin of a diffracted x-ray beam. In certain implementations in which the energies of the diffracted x-ray beams are less than 15 keV, scintillators of low atomic number (Z) materials (e.g., $CaF_2$) or scintillators based on high Z materials (e.g., Lu, Gd, Y, CsI, and Cd) with thicknesses less than 50 microns can be used. In certain implementations, a plurality of different scintillator materials with predetermined thicknesses can be used to obtain energy information of the diffracted x-ray beam.

In certain implementations, the scintillator 20 of the x-ray imaging detector 110 closest to an object (e.g., sample being analyzed) is placed as close to the object as possible (e.g., less than 1 mm, less than 5 mm, less than 20 mm, less than 100 mm). In certain implementations, the scintillators 20 of at least two x-ray imaging detectors 110, for example, with another x-ray detector system 60 (e.g., a flat panel detector; pixel array photon counting detector; a pixel array amorphous Se detector) are configured with a separation distance between the scintillator 20 of one x-ray imaging detector 110 and the scintillator 20 of another adjacent x-ray imaging detector 110 along the x-ray propagation direction 13 greater than 10 mm (e.g., greater than 100 mm; greater than 1000 mm).

In certain implementations, at least two x-ray imaging detectors 110 or at least one x-ray imaging detector 110 and another x-ray detector system 60 (e.g., a flat panel detector; pixel array photon counting detector; a pixel array amorphous Se detector) are configured with predetermined separation distances between adjacent x-ray detectors so that the pixel size projected on an object in a projection x-ray microscope geometry is substantially equal. As scattering and/or refraction of incident x-rays by an object leads to angular change, an x-ray imaging detector 110 placed close to the object will not be sensitive to the angular change while an x-ray imaging detector 110 placed farther away from the object will be more sensitive to the angular change. By recording and processing x-ray images taken by two or more x-ray imaging detectors 110 and/or a flat panel, a pixel array photon counting detector, a pixel array amorphous Se detector, images with absorption, phase, and scattering contrast can be obtained.

In certain implementations, at least two x-ray imaging detectors, or at least one x-ray imaging detector and another x-ray detector system 60 (e.g., a flat panel detector; pixel array photon counting detector; a pixel array amorphous Se detector) are configured with field-of-view differences greater than 1.5×, greater than 3×, or greater than 10×. In certain implementations, the different fields-of-view are centered to each other. In certain implementations, the centers of the different fields-of-view have an offset relative to one another. In certain implementations, a field-of-view image with a smaller area has a higher spatial resolution than a field-of-view image with a larger area. In certain implementations, the smaller field-of-view image with higher resolution is used to improve the spatial resolution of the larger field-of-view image with coarser resolution.

In certain implementations, at least two x-ray imaging detectors 110 are configured to have the same pixel resolution as one another on a plane substantially perpendicular to the x-ray beam propagation direction 13 and are shifted by an integer fraction of the pixel resolution in a direction substantially perpendicular to the x-ray beam propagation direction 13 (e.g., the integer equal to the number of x-ray imaging detectors 110). In certain implementation, the x-ray imaging detectors 110 are configured to have the same pixel resolution as one another on a plane substantially perpendicular to the x-ray beam propagation direction 13 in the sample and are shifted by an integer fraction of the pixel resolution in two substantially orthogonal directions substantially perpendicular to the x-ray beam propagation direction 13 (e.g., with the integer equaling the number of x-ray imaging detectors 110 in the respective direction). In certain implementations, at least two x-ray imaging detectors 110 can be displaced (e.g., shifted) relative to each other in a direction substantially perpendicular to the x-ray beam propagation direction 13. Certain such implementations can concurrently record x-ray transmission images and can use resolution image processing algorithms to obtain better spatial resolution than a single x-ray imaging detector (e.g., by a factor up to the number of x-ray imaging detectors 110 in the respective direction).

In certain implementations, higher resolution in a predetermined direction is used (e.g., direction along a surface normal of an electronic package). To minimize pixel resolution change along the x-ray beam propagation direction 13 within a sample, small separations between the scintillators 20 of the x-ray imaging detectors 110 can be used. Images recorded by these x-ray imaging detectors 110 can be processed using algorithms developed for super resolution by collecting and processing x-ray images before and after shifting (e.g., dithering) a detector 50.

Certain implementations described herein provide one or more features, examples of which include but are not limited to:

Increasing imaging throughput by allowing x-rays transmitted through a thin scintillator 20 to be used for imaging with at least one of: a substantially similar x-ray camera with an aperture, a substantially similar x-ray camera without an aperture, a flat panel detector, a pixel array photon counting detector, an amorphous Se pixel array detector. Certain implementations can use a plurality of similar x-ray cameras configured along the x-ray beam 2 to facilitate high resolution x-ray imaging: high NA for high spatial resolution with short depth-of-focus and a thin scintillator 20 with low x-ray absorption and low detector efficiency.

Concurrent imaging of small field-of-view with high resolution and large field-of-view with coarser resolution. For example, by using high resolution images that overlap with large field-of-view images with coarser resolution, the resolution of the large field-of-view images can be improved.

Obtaining material composition information by utilizing different scintillator properties (e.g., materials and thickness) of x-ray cameras and flat panels or photoconductor materials of photon counting detectors. In certain implementations, the scintillator properties can be used in conjunction with the energy windows of a photon counting detector.

Concurrently imaging with absorption contrast, refraction, and darkfield imaging based on the distance of a camera from the sample as angular change due to scattering and refraction by a feature can be measured by the shift of the image position on a camera/detector, with plural cameras and/or detectors configured with predetermined distances from the sample. For example, a camera placed close to the sample can record mostly the absorption contrast image, a camera/detector position away from the sample can contain a superposition of images from scattering, refraction and darkfield images. By using predetermined distances, the recorded images can be processed according to predetermined algorithms to obtain darkfield, absorption, and phase contrast images.

3D camera to track origins of diffracted x-ray beams, which are generally monochromatic, for performing 3D x-ray diffraction tomography or microscopy by selecting appropriate distances between at least two x-ray imaging detectors to be in a range of 2 mm to 300 mm (e.g., in a range of 5 mm to 100 mm; in a range of 10 mm to 50 mm).

Improving signal-to-noise ratio (S/N) in some images with optimal energy bandwidth and lower radiation dose as compared to a single integrated detector.

Switching scintillator materials and thicknesses in response to sample composition and size.

Smaller scintillators in at least one direction.

Smaller aperture s (e.g., slits or 2D aperture) for high resolution.

Applications in x-Ray Imaging Systems

In certain implementations, a projection x-ray imaging system or a laminography system (e.g., microscope) comprises an apparatus 10,100 in accordance with certain implementations described herein. The system can further comprise an x-ray source for generating x-rays for illuminating an object and can use the apparatus 10,100 as disclosed herein for recording x-rays transmitted through the object. In certain implementations, the upstream-most x-ray imaging detector 110 (e.g., closest to the object) comprises a scintillator 20 and a scintillator holder having one dimension that is comparable or slightly larger than the field-of-view of the x-ray imaging detector 110 in one direction (e.g., to allow an extended flat sample to rotate). In certain implementations, the x-ray source comprises multiple operator-selectable target materials to select x-rays with certain spectral characteristics. In certain implementations, the apparatus 10,100 is configured to obtain an x-ray absorption contrast image and x-ray scattering (e.g., darkfield) image and/or x-ray phase contrast image concurrently.

Certain implementations are configured for imaging and inspection of hybrid bonding of semiconductor packaging. A first x-ray imaging detector 110a configured with high spatial resolution (e.g., less than 1 micron; less than 3 microns) can be placed close to a test sample and a second x-ray detector 60 (e.g., a flat panel detector, pixel array photon counting detector, or a pixel array amorphous Se detector) can be placed at a distance such that the projected pixel size of the second detector 60 at the sample is comparable to that of the first x-ray imaging detector 110 placed close to the sample. In another implementation, at least one x-ray imaging detector 110 with a spatial resolution better than 10 microns (e.g., better than 5 microns) is configured between the high resolution first x-ray imaging detector 110 and the second detector 60 and the second detector 60 is configured with a resolution comparable with a resolution of the first x-ray imaging detector 110 placed close to the sample. For imaging hybrid bonding integrated circuit (IC) packages, parameters of an x-ray laminography imaging system can be: an x-ray source with a target material producing characteristic line around 20 keV (e.g., Mo, Rh, Pd, and Ag), an x-ray imaging detector 110 with a thin scintillator 20 (e.g., thickness less than 50 microns; less than 20 microns; less than 10 microns) comprising a scintillator material with high x-ray absorption efficiency for x-rays of energies in a range of 15 keV to 30 keV, and a pixel array amorphous Se detector 60 with Se thickness in a range of 100 microns to 400 microns (e.g., approximately equal to 200 microns) placed at a distance such that a projected pixel size of the pixel array amorphous Se detector 60 at the sample position is small (e.g., less than or equal to 3 microns; less than or equal to 1 micron) and a laminography slant angle (e.g., the angle between the x-ray imaging beam axis and a plane perpendicular to the sample rotation axis) in a range of 5 degrees to 45 degrees (e.g., in a range of 10 degrees to 30 degrees). Additional x-ray imaging detectors 110 between the first x-ray imaging detector 110 and the pixel array amorphous Se detector 60 can be added to improve imaging speed and/or additional materials information.

In certain implementations, the apparatus 10,100 is configured to achieve a predetermined spatial resolution (e.g., better than 5 microns; better than 2 microns; better than 1 micron) in a predetermined direction (e.g., along the surface normal direction of a semiconductor electron package or a semiconductor wafer). Certain implementations comprise an x-ray source with a source size along the predetermined direction that is comparable to or smaller than the predetermined spatial resolution (e.g., 5 microns; 2 microns; 1 micron). In certain implementations, the plurality of x-ray imaging detectors 110 are configured with spatial resolutions comparable to or finer than the predetermined spatial resolution along the predetermined direction. In certain implementations, at least two x-ray imaging detectors 110 are configured to have the same pixel resolution as one another on a plane substantially perpendicular to the x-ray beam propagation direction 13 and shifted by an integer fraction of the pixel resolution in the predetermined direction (e.g., the integer equal to the number of x-ray imaging detectors 110).

In certain implementation, the plurality of x-ray imaging detectors 110 are configured to have the same pixel resolution as one another on a plane substantially perpendicular to the x-ray beam propagation direction 13 in the sample and shifted by an integer fraction of the pixel resolution in the predetermined direction (e.g., with the integer equaling the number of x-ray imaging detectors 110 in the respective direction).

In certain implementations for x-ray imaging of 3D integration of the semiconductor chips using hybrid bonding, the apparatus 10,100 is configured with at least one x-ray imaging detector 110 with a thin scintillator 20 (e.g., YAG or CsI scintillator having a thickness less than or equal to 200 microns, less than or equal to 50 microns, or less than or equal to 10 microns) and an amorphous Se pixel array detector 60 downstream of the at least one x-ray imaging detector 110. In certain implementations, the apparatus 10,100 is configured in a laminographic geometry to image 3D integration of the semiconductor chips using hybrid bonding.

Various implementations disclosed herein can be used for x-ray imaging. Some additional features for x-ray imaging provided by certain implementations described herein include but are not limited to: automated detection of source and sample position movement by having the positions of the x-ray imaging detectors 110 fixed relative to one another while the sample and/or the x-ray source are movable during image collection; identifying and reducing (e.g., minimizing) the effect of scintillator defects (e.g., because it is unlikely that the pixels of different scintillators 20 along the x-ray beam propagation direction 13 have defects that are aligned with one another).

X-Ray Diffraction Microscopy

Certain implementations described herein provide an apparatus 10,100 for x-ray diffraction microscopy comprising an x-ray source for generating x-rays for illuminating an object, an x-ray focusing optical system for generating a focused x-ray beam in at least one direction (e.g., a focused pencil beam, a focused fan beam), and a sequential array of x-ray imaging detectors 110 as disclosed herein for recording x-ray beams diffracted by the object. In certain implementations, the apparatus 10,100 comprises an x-ray imaging detector 110 with resolution better than 10 microns (e.g., better than 5 microns, better than 2 microns) and is configured to be placed close to an object (e.g., the upstream-most x-ray imaging detector 110 of the apparatus 10,110), and at least one of the x-ray imaging detectors 110 is configured to be placed at a predetermined distance from the object and the upstream-most x-ray imaging detector 110 of the apparatus 10,100 (e.g., greater than 5 mm, greater than 10 mm, greater than 50 mm, greater than 200 mm). A large predetermined distance can provide better determination of the origin of diffracted beams than does a small predetermined distance. The scintillator 20 of the upstream-most x-ray imaging detector 110 can be configured to have at least 5% x-ray transmission for diffracted x-rays. In certain implementations, more than three (e.g., more than ten) x-ray imaging detectors 110 configured sequentially along the x-ray propagation direction 13 are used. In certain implementations, at least two x-ray imaging detectors 110 are separated by a distance greater than 5 mm (e.g., greater than 20 mm).

Although commonly used terms are used to describe the systems and methods of certain implementations for ease of understanding, these terms are used herein to have their broadest reasonable interpretations. Although various aspects of the disclosure are described with regard to illustrative examples and implementations, the disclosed examples and implementations should not be construed as limiting. Conditional language, such as "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements, and/or steps are in any way required for one or more implementations. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Conjunctive language such as the phrase "at least one of X, Y, and Z," unless specifically stated otherwise, is to be understood within the context used in general to convey that an item, term, etc. may be either X, Y, or Z. Thus, such conjunctive language is not generally intended to imply that certain implementations require the presence of at least one of X, at least one of Y, and at least one of Z.

Language of degree, as used herein, such as the terms "approximately," "about," "generally," and "substantially," represent a value, amount, or characteristic close to the stated value, amount, or characteristic that still performs a desired function or achieves a desired result. For example, the terms "approximately," "about," "generally," and "substantially" may refer to an amount that is within ±10% of, within ±5% of, within ±2% of, within ±1% of, or within ±0.1% of the stated amount. As another example, the terms "generally parallel" and "substantially parallel" refer to a value, amount, or characteristic that departs from exactly parallel by ±10 degrees, by ±5 degrees, by ±2 degrees, by ±1 degree, or by ±0.1 degree, and the terms "generally perpendicular" and "substantially perpendicular" refer to a value, amount, or characteristic that departs from exactly perpendicular by ±10 degrees, by ±5 degrees, by ±2 degrees, by ±1 degree, or by ±0.1 degree. The ranges disclosed herein also encompass any and all overlap, sub-ranges, and combinations thereof. Language such as "up to," "at least," "greater than," less than," "between," and the like includes the number recited. As used herein, the meaning of "a," "an," and "said" includes plural reference unless the context clearly dictates otherwise. While the structures and/or methods are discussed herein in terms of elements labeled by ordinal adjectives (e.g., first, second, etc.), the ordinal adjectives are used merely as labels to distinguish one element from another, and the ordinal adjectives are not used to denote an order of these elements or of their use.

Various configurations have been described above. It is to be appreciated that the implementations disclosed herein are not mutually exclusive and may be combined with one another in various arrangements. Although this invention has been described with reference to these specific configurations, the descriptions are intended to be illustrative of the invention and are not intended to be limiting. Various modifications and applications may occur to those skilled in the art without departing from the true spirit and scope of the invention. Thus, for example, in any method or process disclosed herein, the acts or operations making up the method/process may be performed in any suitable sequence and are not necessarily limited to any particular disclosed sequence. Features or elements from various implementations and examples discussed above may be combined with one another to produce alternative configurations compatible with implementations disclosed herein. Various aspects and advantages of the implementations have been described where appropriate. It is to be understood that not necessarily all such aspects or advantages may be achieved in accordance with any particular implementation. Thus, for example, it should be recognized that the various implementations may be carried out in a manner that achieves or optimizes one advantage or group of advantages as taught herein without necessarily achieving other aspects or advantages as may be taught or suggested herein.

What is claimed is:

1. An apparatus comprising:
    at least one scintillator configured to allow first x-rays of an x-ray beam incident on the at least one scintillator to propagate through the at least one scintillator and to generate visible light in response to second x-rays of the x-ray beam;
    at least one optical lens system configured to allow a propagation of at least a first portion of the first x-rays through the at least one optical lens system and to relay at least some of the visible light to an image plane of the at least one optical lens system;
    at least one mirror configured to allow a propagation of at least a second portion of the first portion of the first x-rays through the at least one mirror and to reflect at least some of the visible light from the at least one optical lens system in a direction non-parallel relative to an x-ray propagation direction of the first x-rays propagating through the at least one optical lens system and the at least one mirror; and
    at least one optical detector system comprising a plurality of active elements at the image plane of the at least one optical lens system and configured to receive the visible light reflected by the at least one mirror.

2. The apparatus of claim 1, wherein the at least one optical lens system comprises at least one aperture configured to allow a propagation of the first portion of the first x-rays through the at least one optical lens system.

3. The apparatus of claim 1, wherein the at least one optical lens system is downstream from the at least one scintillator.

4. The apparatus of claim 1, wherein the x-ray beam comprises an x-ray image, and the at least one scintillator is configured to convert the second x-rays of the x-ray beam to an optical image.

5. The apparatus of claim 1, wherein the at least one mirror is downstream from the at least one optical lens system.

6. The apparatus of claim 1, wherein the at least one optical detector system comprises a CCD camera or a CMOS camera.

7. The apparatus of claim 1, wherein the at least one optical detector system comprises at least one lens configured to receive and focus the visible light reflected from the at least one mirror onto the plurality of active elements.

8. The apparatus of claim 1, further comprising an x-ray detector system positioned downstream from the at least one optical detector system.

9. An apparatus comprising:
    at least a first x-ray imaging detector and a second x-ray imaging detector, the first x-ray imaging detector and the second x-ray imaging detector configured sequentially along a propagation direction of an x-ray beam, the first x-ray imaging detector comprising at least one aperture configured to allow x-rays to propagate through the at least one aperture to the second x-ray imaging detector.

10. The apparatus of claim 9, wherein at least one of the first x-ray imaging detector and the second x-ray imaging detector comprises a type-I x-ray imaging detector.

11. The apparatus of claim 9, wherein at least one of the first x-ray imaging detector and the second x-ray imaging detector comprises a type-II x-ray imaging detector.

12. The apparatus of claim 9, wherein the first x-ray imaging detector and the second x-ray imaging detector comprises at least one type-I or type-II x-ray imaging detector, and the apparatus further comprises at least one additional detector selected from the group consisting of: a type-II x-ray imaging detector, a flat panel detector, a pixel array photon counting detector, and an amorphous Se pixel array detector.

13. The apparatus of claim 9, wherein the first x-ray imaging detector comprises a first scintillator with a first scintillator material, and the second x-ray imaging detector comprises a second scintillator with a second scintillator material different from the first scintillator material, the first scintillator material and the second scintillator material having predetermined x-ray absorption properties that are different from one another.

14. The apparatus of claim 13, wherein the first scintillator and the second scintillator are separated from one another by a separation distance along the propagation direction of the x-ray beam greater than 5 mm.

15. The apparatus of claim 13, wherein the first x-ray imaging detector has a first field-of-view, and the second x-ray imaging detector has a second field-of-view, wherein a ratio of the first field-of-view to the second field-of-view is in a range of 1 to 50.

16. The apparatus of claim 9, wherein at least one of the first x-ray imaging detector and the second x-ray imaging detector comprises:
a scintillator configured to be irradiated by the x-ray beam propagating along the propagation direction, to generate visible light in response to at least some x-rays of the x-ray beam, and to allow at least some x-rays of the x-ray beam to propagate through the scintillator; and
a mirror configured to receive at least some of the visible light from the scintillator, and to allow at least some x-rays of the x-ray beam that propagate through the scintillator to propagate through the mirror.

17. The apparatus of claim 16, wherein the at least one of the first x-ray imaging detector and the second x-ray imaging detector further comprises:
a lens configured to receive and focus at least some of the visible light reflected by the mirror; and
a camera configured to receive the focused visible light from the lens.

18. An apparatus comprising:
at least a first x-ray imaging detector and a second x-ray imaging detector, the first x-ray imaging detector and the second x-ray imaging detector configured sequentially along a propagation direction of an x-ray beam, the first x-ray imaging detector comprising at least one aperture configured to allow x-rays to propagate through the at least one aperture to the second x-ray imaging detector, wherein at least one of the first x-ray imaging detector and the second x-ray imaging detector comprises:
a first scintillator configured to be irradiated by the x-ray beam propagating along the propagation direction, to generate first visible light in response to at least some x-rays of the x-ray beam, and to allow at least some x-rays of the x-ray beam to propagate through the first scintillator;
a first optical lens system configured to receive at least some of the first visible light from the first scintillator, and to allow at least some x-rays of the x-ray beam that propagate through the first scintillator to propagate through the first optical lens system;
a first mirror configured to reflect at least some of the first visible light from the first optical lens system in a first direction non-parallel relative to the propagation direction of the x-ray beam, and to allow at least some x-rays of the x-ray beam that propagate through the first optical lens system to propagate through the first mirror; and
a first optical detector system configured to receive at least some of the first visible light reflected by the first mirror, and to generate a first image in response to the received at least some of the first visible light.

19. The apparatus of claim 18, wherein at least one of the first optical lens system and the first mirror comprises the at least one aperture.

20. The apparatus of claim 18, wherein the first optical detector system comprises a first camera and a first lens configured to receive and focus at least some of the first visible light from the first mirror onto the first camera.

21. The apparatus of claim 18, wherein at least one of the first x-ray imaging detector and the second x-ray imaging detector comprises:
a second scintillator configured to be irradiated by the x-ray beam propagating along the propagation direction of the x-ray beam, to generate second visible light in response to at least some x-rays of the x-ray beam, and to allow at least some x-rays of the x-ray beam to propagate through the second scintillator;
a second optical lens system configured to receive at least some of the second visible light from the second scintillator, and to allow at least some x-rays of the x-ray beam that propagate through the second scintillator to propagate through the second optical lens system;
a second mirror configured to reflect at least some of the second visible light from the second optical lens system in a second direction non-parallel relative to the propagation direction of the x-ray beam, and to allow at least some x-rays of the x-ray beam that propagate through the second optical lens system to propagate through the second mirror; and
a second optical detector system configured to receive at least some of the second visible light reflected by the second mirror, and to generate a second image in response to the received at least some of the second visible light.

22. The apparatus of claim 21, wherein at least one of the second optical lens system and the second mirror comprises an aperture.

23. The apparatus of claim 21, wherein the second optical detector system comprises a second camera and a second lens configured to receive and focus at least some of the second visible light from the second mirror onto the second camera.

* * * * *